United States Patent
Higashiya et al.

(10) Patent No.: US 12,422,838 B2
(45) Date of Patent: Sep. 23, 2025

(54) SCADA WEB HMI SYSTEM

(71) Applicant: Toshiba Mitsubishi-Electric Industrial Systems Corporation, Tokyo (JP)

(72) Inventors: Ryosuke Higashiya, Tokyo (JP); Akira Nojima, Tokyo (JP); Nobuo Shimizu, Tokyo (JP); Ryo Shimizu, Tokyo (JP)

(73) Assignee: TMEIC CORPORATION, Tokyo (JP)

( * ) Notice: Subject to any disclaimer, the term of this patent is extended or adjusted under 35 U.S.C. 154(b) by 840 days.

(21) Appl. No.: 17/754,599

(22) PCT Filed: Jun. 30, 2020

(86) PCT No.: PCT/JP2020/025653
§ 371 (c)(1),
(2) Date: Apr. 7, 2022

(87) PCT Pub. No.: WO2022/003818
PCT Pub. Date: Jan. 6, 2022

(65) Prior Publication Data
US 2022/0390934 A1    Dec. 8, 2022

(51) Int. Cl.
G05B 23/02    (2006.01)
G05B 19/05    (2006.01)

(52) U.S. Cl.
CPC ......... *G05B 23/0272* (2013.01); *G05B 19/05* (2013.01); *G05B 23/0216* (2013.01);
(Continued)

(58) Field of Classification Search
CPC ................ G05B 23/0272; G05B 19/05; G05B 23/0216; G05B 2219/23067;
(Continued)

(56) References Cited

U.S. PATENT DOCUMENTS

2003/0105535 A1* 6/2003 Rammler ............. G05B 19/409
                                                                    700/20
2014/0081430 A1* 3/2014 Timsjo ............... G05B 19/0426
                                                                    700/83
(Continued)

FOREIGN PATENT DOCUMENTS

JP    2007-536622 A    12/2007
JP      2008-9500 A     1/2008
(Continued)

OTHER PUBLICATIONS

Office Action issued on Nov. 13, 2023, in corresponding Indian patent Application No. 202317001770, 6 pages.
(Continued)

*Primary Examiner* — Daniel F Hajnik
*Assistant Examiner* — Thomas John Foster
(74) *Attorney, Agent, or Firm* — XSENSUS LLP

(57) ABSTRACT

A SCADA web HMI system generates an integrated component by grouping components including a first component and provides a first animation effect to the integrated component. The first animation effect is applied to the integrated component as a whole but not individually applied to components constituting the integrated component. The system provides a second animation effect to the first component. The second animation effect is applied to the first component but not applied to the components constituting the integrated component except for the first component. The system associates the first animation effect with the value of a first PLC signal and changes the appearance of the integrated component according to the value of the first PLC signal. The system associates the second animation effect with the value of a second PLC signal and changes the appearance of the first component according to the value of the second PLC signal.

5 Claims, 26 Drawing Sheets

(52) U.S. Cl.
CPC .............. *G05B 2219/23067* (2013.01); *G05B 2219/24215* (2013.01)

(58) Field of Classification Search
CPC ........ G05B 2219/24215; G05B 19/058; G06F 3/0481; G06F 3/04817; G06F 3/04842; G06F 3/04845; G06F 3/0486
See application file for complete search history.

(56) References Cited

U.S. PATENT DOCUMENTS

2015/0106753 A1* 4/2015 Tran ................... G05B 23/0272
    715/765
2017/0003665 A1* 1/2017 Lane ........................ G05B 9/02

FOREIGN PATENT DOCUMENTS

| JP | 2015114827 A | * | 6/2015 | ............. B21B 38/00 |
| JP | 2017-27211 A | | 2/2017 | |
| WO | 2020/090027 A1 | | 5/2020 | |

OTHER PUBLICATIONS

International Search Report and Written Opinion mailed on Aug. 11, 2020, received for PCT Application PCT/JP2020/025653, Filed on Jun. 30, 2020, 8 pages including English Translation.

\* cited by examiner

| COMPONENT NUMBER | ATTRIBUTE NAME | ATTRIBUTE VALUE | RELATION |
|---|---|---|---|
| 1 | POSITION Y | | | ～51
| 2 | POSITION Y | | | ～52
| 3 | POSITION Y | | | ～53
| 4 | POSITION Y | | | ～54

| COMPONENT NUMBER | COMPONENT NAME | ITEM NAME (PLC SIGNAL NAME) |
|---|---|---|
| 1 | FIRST RECTANGLE | G1_1SL_MY = 1 |
| 2 | SECOND RECTANGLE | G1_2SL_MY = 1 |
| 3 | THIRD RECTANGLE | G1_3SL_MY = 2 |
| 4 | FOURTH RECTANGLE | G1_4SL_MY = 2 |

| COMPONENT NUMBER | ATTRIBUTE NAME | ATTRIBUTE VALUE | RELATION |
|---|---|---|---|
| 1 | POSITION Y | | CHILD OF 10 |
| 2 | POSITION Y | | CHILD OF 10 |
| 10 | POSITION X | | PARENT OF 1 AND 2 |

- 41
- 42
- 43

| COMPONENT NUMBER | COMPONENT NAME | ITEM NAME (PLC SIGNAL NAME) |
|---|---|---|
| 1 | FIRST RECTANGLE | G1_1SL_MY = 1 |
| 2 | SECOND RECTANGLE | G1_2SL_MY = 2 |
| 10 | TENTH INTEGRATED COMPONENT | G1_10SL_MX = 1 |

| COMPONENT NUMBER | ATTRIBUTE NAME | ATTRIBUTE VALUE | RELATION | |
|---|---|---|---|---|
| 1 | POSITION Y | | CHILD OF 10 | 51 |
| 2 | POSITION Y | | CHILD OF 10 | 52 |
| 3 | POSITION Y | | CHILD OF 20 | 53 |
| 4 | POSITION Y | | CHILD OF 20 | 54 |
| 10 | POSITION Y | | PARENT OF 1 AND 2 CHILD OF 100 | 55 |
| 20 | POSITION Y | | PARENT OF 1 AND 2 CHILD OF 100 | 56 |
| 100 | POSITION X | | PARENT OF 10 AND 20 | 57 |

| COMPONENT NUMBER | COMPONENT NAME | ITEM NAME (PLC SIGNAL NAME) |
|---|---|---|
| 1 | FIRST RECTANGLE | G1_1SL_MY = 0 |
| 2 | SECOND RECTANGLE | G1_2SL_MY = 0 |
| 3 | THIRD RECTANGLE | G1_3SL_MY = 0 |
| 4 | FOURTH RECTANGLE | G1_4SL_MY = 0 |
| 10 | TENTH INTEGRATED COMPONENT | G1_10SL_MY = 0 |
| 20 | TWENTIETH INTEGRATED COMPONENT | G1_20SL_MY = 0 |
| 100 | HUNDREDTH INTEGRATED COMPONENT | G1_100SL_MX = 0 |

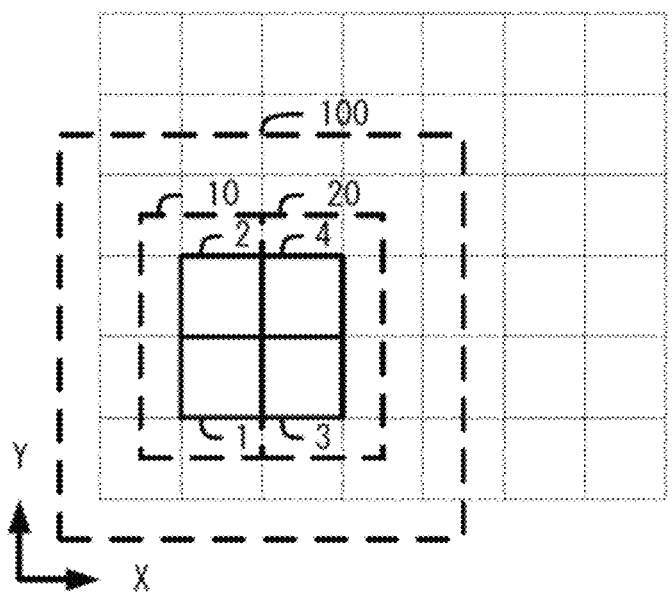

FIG.16

| COMPONENT NUMBER | ATTRIBUTE NAME | ATTRIBUTE VALUE | RELATION |
|---|---|---|---|
| 1 | POSITION Y | | CHILD OF 10 |
| 2 | POSITION Y | | CHILD OF 10 |
| 3 | POSITION Y | | CHILD OF 20 |
| 4 | POSITION Y | | CHILD OF 20 |
| 10 | POSITION Y | | PARENT OF 1 AND 2 CHILD OF 100 |
| 20 | POSITION Y | | PARENT OF 1 AND 2 CHILD OF 100 |
| 100 | POSITION X | | PARENT OF 10 AND 20 |

51, 52, 53, 54, 55, 56, 57

| COMPONENT NUMBER | COMPONENT NAME | ITEM NAME (PLC SIGNAL NAME) |
|---|---|---|
| 1 | FIRST RECTANGLE | G1_1SL_MY = 0 |
| 2 | SECOND RECTANGLE | G1_2SL_MY = 0 |
| 3 | THIRD RECTANGLE | G1_3SL_MY = 0 |
| 4 | FOURTH RECTANGLE | G1_4SL_MY = 0 |
| 10 | TENTH INTEGRATED COMPONENT | G1_10SL_MY = 1 |
| 20 | TWENTIETH INTEGRATED COMPONENT | G1_20SL_MY = 2 |
| 100 | HUNDREDTH INTEGRATED COMPONENT | G1_100SL_MX = 1 |

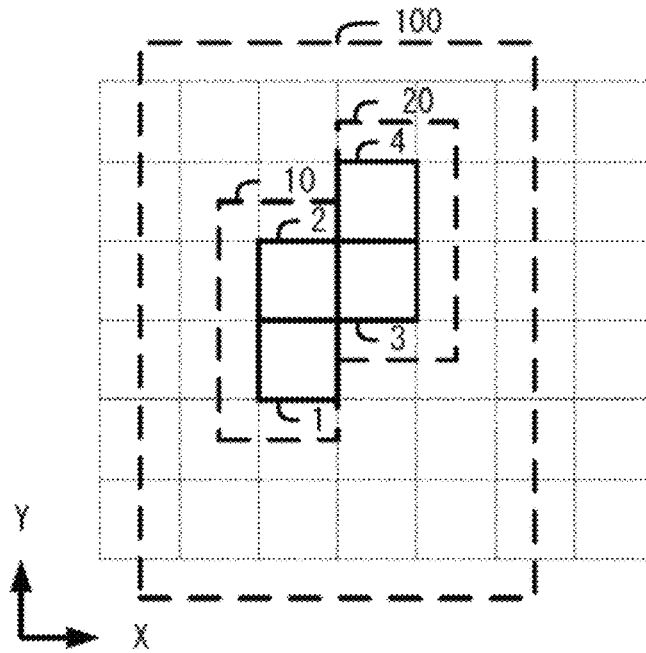

FIG.17

| COMPONENT NUMBER | ATTRIBUTE NAME | ATTRIBUTE VALUE | RELATION | |
|---|---|---|---|---|
| 401 | COLOR | 0 \| 1 (▨) | CHILD OF 405 | 411 |
| 402 | ROTATION | | CHILD OF 405 | 412 |
| 403 | ROTATION | | CHILD OF 405 | 413 |
| 404 | COLOR | 0 \| 1 (▨) | CHILD OF 405 | 414a |
| 404 | SCALE UP | | CHILD OF 405 | 414b |
| 405 | POSITION X | | PARENT OF 401 TO 405 | 415 |

| COMPONENT NUMBER | COMPONENT NAME | ITEM NAME (PLC SIGNAL NAME) |
|---|---|---|
| 401 | 401th RECTANGLE | G1_401SL |
| 402 | 402th INTEGRATED COMPONENT | G1_402SL_R |
| 403 | 403th INTEGRATED COMPONENT | G1_403SL_R |
| 404 | 404th INTEGRATED COMPONENT | G1_404SL |
| 404 | 404th INTEGRATED COMPONENT | G1_404SL_EWH |
| 405 | 405th INTEGRATED COMPONENT | G1_405SL_MX |

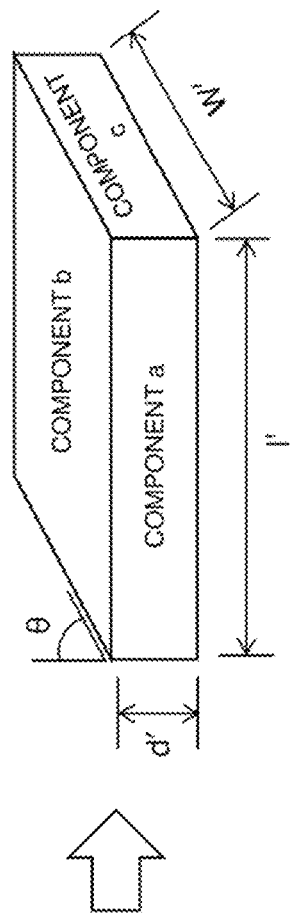
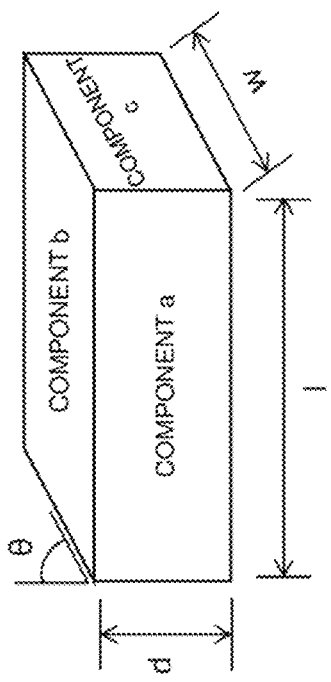
FIG.28

SCADA WEB HMI SYSTEM

CROSS-REFERENCE TO RELATED APPLICATION

The present application is based on PCT filing PCT/JP2020/025653, filed Jun. 30, 2020, the entire contents of which is incorporated herein by reference.

TECHNICAL FIELD

The present invention relates to a SCADA web HMI system, and particularly relates to a SCADA web HMI system having an animation expression implementation support function.

BACKGROUND

Supervisory control and data acquisition (SCADA) is known as a mechanism for monitoring and controlling a social infrastructure system. The social infrastructure system includes, for example, an iron steel milling system, an electric power transmitting-transforming system, a water-sewer treatment system, a building management system, and a road system.

The SCADA is a kind of an industrial control system that performs system monitoring and process control by a computer. The SCADA needs readiness (real-time property) in accordance with processing performance of a system.

The SCADA is typically achieved by sub systems as follows.
(1) Human Machine Interface (HMI)

An HMI is a mechanism configured to present data of a target process (monitoring target device) to an operator so that the operator can monitor and control the process. For example, Patent Document 1 discloses a SCADA HMI including an HMI screen that operates on a SCADA client.
(2) Monitoring Control System A monitoring control system collects signal data (PLC signal) on a process and transfers a control command to the process. The monitoring control system is achieved by a programable logic controller (PLC).
(3) Remote Input-Output (RIO)

A remote input-output is connected to a sensor installed in a process, converts a signal from the sensor into digital data, and transfers the digital data to the monitoring control system.
(4) Communication Infrastructure A communication infrastructure connects the monitoring control system and the remote input-output.

PRIOR-ART DOCUMENT

Patent Document

[Patent Document 1] JP 2017-27211 A

SUMMARY

Technical Problem

A client program of an HMI sub system in Patent Document 1 is established by a computer program depending on a machine environment. To achieve cost reduction of a SCADA HMI sub system, the inventor of the present application has reached development of a browser-based SCADA HMI sub system that does not depend on a machine environment.

When the SCADA HMI sub system is established as a web application that operates a web browser, advantages listed below are obtained.
(1) Various terminal instruments can be used as the SCADA HMI sub system since web browsers are implemented on a large number of terminal instruments such as a personal computer (PC) and a tablet PC.
(2) A web browser has a sophisticated rendering function, and a high-level GUI interaction function such as animation can be easily implemented thereon.

In the SCADA HMI sub system, an HMI screen is produced by using a drawing production device called an engineering tool.

A plurality of components are placed on the HMI screen. In conventional SCADA, at least one data element called "tag" or "point" is allocated to each component. A unique PLC signal is allocated to each data element. Specifically, n PLC signals are allocated for n data elements (for example, the display colors of the components) on the HMI screen and transmitted from the monitoring control system (PLC) to the HMI sub system. The HMI sub system changes the appearance of the components on the HMI screen through animation in accordance with the PLC signals received from the monitoring control system (PLC).

FIG. 30 is an exemplary material conveyance vehicle schematic diagram produced as the HMI screen. The material conveyance vehicle schematic diagram presents, to an operator, the position, an operation state, and a loaded material state of a material conveyance vehicle in a conveyance system. The material conveyance vehicle drawn in the material conveyance vehicle schematic diagram is constituted by wheels, a cargo bed, and a material loaded on the cargo bed. These are configured to as four components 401 to 404 as combinations of primitive components (straight line, rectangle, circle). The component 401 represents the cargo bed, the components 402 and 403 represent the wheels, and the component 404 represents the material. These four components are each allocated with a unique data element, the type of a computer program for controlling an animation effect of the component, and parameters of the computer program.

To express movement of the material conveyance vehicle, the component 402 and 403 as the wheels need to move in accordance with the position of the material conveyance vehicle as illustrated in FIG. 31. In addition, the component 401 as the cargo bed and the component 404 as the material loaded on the cargo bed need to move in accordance with the position of the material conveyance vehicle. Moreover, the components 402 and 403 as the wheels need to rotate in accordance with the position of the material conveyance vehicle as illustrated in FIG. 32. Conventionally, to achieve these motions, the components 402 and 403 as the wheels have been provided with an animation effect of rotation and an animation effect of movement. In addition, the component 401 as the cargo bed and the component 404 as the material have been provided with an animation effect of movement synchronized with movement of the components 402 and 403 as the wheels. In other words, to draw the material conveyance vehicle as an integrated component, it has been needed to design a computer program that cooperatively achieve animation effects of the four components 401 to 404.

However, it is not easy to cooperate animation effects of components. As the number of components increases, man-hour taken for programming for cooperating their animation effects increases. Thus, it is discussed to improve designing efficiency by handling a plurality of components as an integrated component to reduce the number of components to be provided with animation effects. In the case of the material conveyance vehicle schematic diagram illustrated in FIG. 30, designing efficiency can be improved by handling, as an integrated component, the wheels and the cargo bed of the material conveyance vehicle and the material loaded on the cargo bed. However, a high-level animation effect cannot be achieved only by simply integrating components. For example, the components 402 and 403 as the wheels need to be provided with animation effects of rotation, but can be provided with only an animation effect of movement when simply integrated with the other components 401 and 404.

The present invention is intended to solve the above-described problem and provide a SCADA web HMI system that can improve designing efficiency of an HMI screen having high-level animation effects.

Solution to Problem

To achieve the above-described intention, a SCADA web HMI system according to the present invention is configured as described below.

The SCADA web HMI system includes a web browser configured to display an HMI screen. The SCADA web HMI system changes the appearance of a component placed on the HMI screen in accordance with the value of a PLC signal received from a programmable logic controller.

The SCADA web HMI system includes at least one processor, and at least one memory storing at least one computer program. The at least a processor executes first to fifth processing below in accordance with the at least one computer program.

The first processing is processing of generating an integrated component by grouping a plurality of components including a first component. Grouping in the present specification means definition of a plurality of components as a new integrated component. Unique data elements of individual components included in a group are maintained by grouping unlike consolidation that collects data elements of a plurality of components that are integrated.

The second processing is processing of providing a first animation effect to the integrated component. The first animation effect is applied to the integrated component as a whole but not individually applied to constituent components of the integrated component. The first animation effect may include at least one of display color change of the integrated component and a figure transformation of the integrated component. Furthermore, the figure transformation of the integrated component may include at least one of scaling, rotation, translation, shear, and a combination thereof as subsets of an affine transformation.

The third processing is processing of providing a second animation effect to the first component. The second animation effect is applied to the first component among the constituent components of the integrated component but not applied to the other components. The second animation effect may include at least one of display color change of the first component and a figure transformation of the first component. The figure transformation of the first component may include at least one of scaling, rotation, translation, shear, and a combination thereof.

The fourth processing is processing of associating the first animation effect with the value of a first PLC signal and associating the second animation effect with the value of a second PLC signal. Specifically, when the animation effects are a transformation, these pieces of processing are each processing of allocating the value of the PLC signal to parameters sx, sy, θ, tx, ty, α, and β of scale(sx, sy), rorate(θ), translate(tx, ty), and skew(α, β) and executing each transformation. These scale(sx, sy), rorate(θ), translate(tx, ty), and skew(α, β) are matrix transformations representing partial transformations of an affine transformation.

The fifth processing is processing of receiving the first PLC signal, changing the appearance of the integrated component in the HMI screen through animation in accordance with the value of the first PLC signal, receiving the second PLC signal, and changing the appearance of the first component in the HMI screen through animation in accordance with the value of the second PLC signal.

In addition to the above-described first to fifth processing, the at least one processor may execute sixth to ninth processing below in accordance with the at least one computer program. First, the sixth processing is processing of generating a duplicate integrated component by grouping a plurality of components including the integrated component.

The seventh processing is processing of providing a third animation effect to the duplicate integrated component. The third animation effect is applied to the duplicate integrated component as a whole but not individually applied to constituent components of the duplicate integrated component. The third animation effect may include at least one of display color change of the duplicate integrated component and a figure transformation of the duplicate integrated component. The figure transformation of the duplicate integrated component may include at least one of scaling, rotation, translation, shear, and a combination thereof as subsets of an affine transformation.

The eighth processing is processing of associating the third animation effect with the value of a third PLC signal. The ninth processing is processing of receiving the third PLC signal and changing the appearance of the duplicate integrated component in the HMI screen through animation in accordance with the value of the third PLC signal.

The above-described SCADA web HMI system may be provided in an iron steel milling monitoring control system. In this case, the above-described SCADA web HMI system may be configured to provide a slab made of a plurality of components on the HMI screen and change the appearance of the slab in the HMI screen through animation in accordance with the value of the PLC signal from the programmable logic controller placed on an iron steel milling line.

Effects

With a SCADA web HMI system according to the present invention, an integrated component is provided with an animation effect that is applied to the integrated component as a whole but not individually applied to components included in the integrated component. Each component included in the integrated component is provided with an animation effect that is applied to the component but not applied to any other component included in the integrated component. In this manner, since the integrated component and each component included in the integrated component are each provided with an independent animation effect, it is possible to produce an HMI screen having high-level animation effects and achieve improvement of designing efficiency of the HMI screen.

BRIEF DESCRIPTION OF THE DRAWINGS

FIG. 16 is a diagram illustrating a second example of grouping processing.

FIG. 17 is a diagram illustrating the second example of grouping processing.

FIG. 21 is a diagram illustrating component data of the material conveyance vehicle schematic diagram illustrated in FIG. 20.

FIG. 24 is an exemplary screen of a GUI that defines attributes for providing an animation effect to a component.

FIG. 28 is a diagram for description of a figure transformation of the slab schematic diagram by the SCADA web HMI system according to the second embodiment of the present invention.

DESCRIPTION OF EMBODIMENTS

Embodiments of the present invention will be described below in detail with reference to the accompanying drawings. When a value such as the number, quantity, amount, or range of an element is mentioned in the embodiments below, the present invention is not limited by the mentioned value except for a case in which description is explicitly made otherwise and a case in which the value is specific in principle. Furthermore, for example, a structure described below in the embodiments is not necessarily essential for the present invention except for a case in which description is explicitly made otherwise and a case in which the structure is specific in principle. Note that any common element among the drawings is denoted by an identical reference sign and duplicate description is omitted.

1. First Embodiment

1-1. Overview

Figure 1:
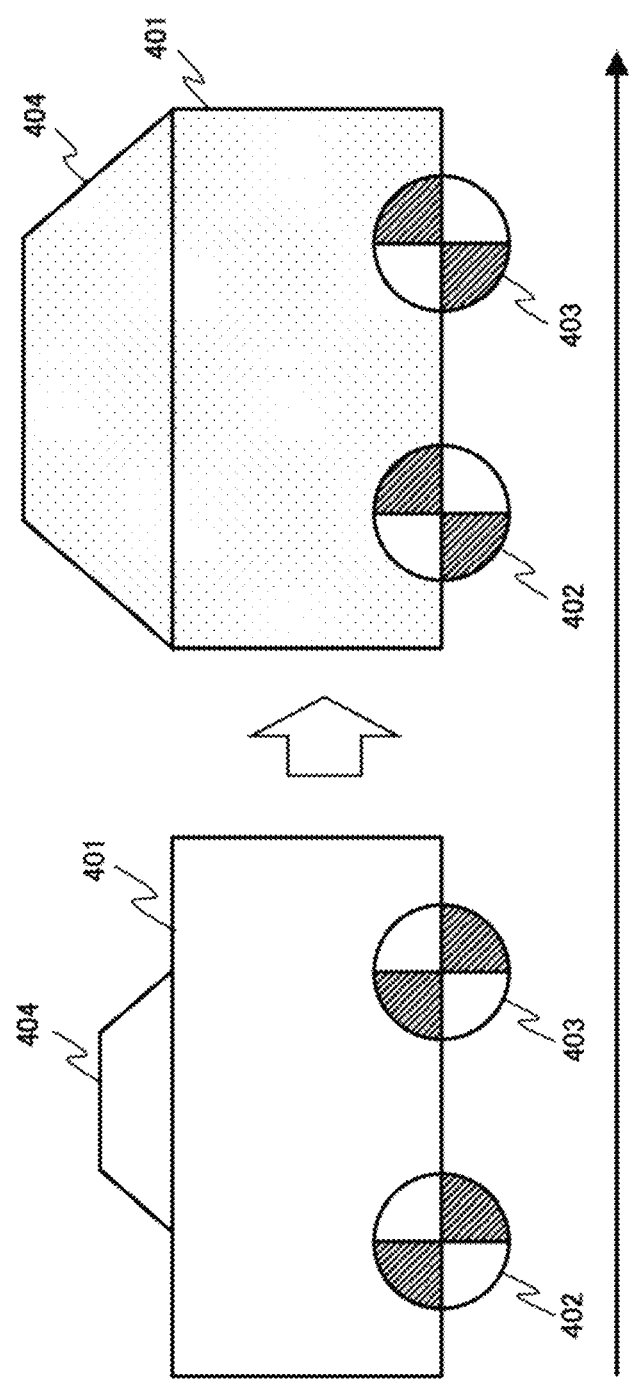
FIG. 1 is exemplary animation of a material conveyance vehicle schematic diagram displayed on an HMI screen by a SCADA web HMI system according to a first embodiment of the present invention.

First, an overview of a SCADA web HMI system according to a first embodiment of the present invention will be described below. FIG. 1 is exemplary animation of a material conveyance vehicle schematic diagram displayed on an HMI screen by the present SCADA web HMI system. In the present embodiment, the material conveyance vehicle schematic diagram is provided with such an animation effect that the amount of material loaded on a cargo bed increases and the display colors of the cargo bed and the material changes as the material conveyance vehicle illustrated in FIG. 1 moves from the left to the right.

The material conveyance vehicle illustrated in FIG. 1 is constituted by four components 401 to 404. To achieve the above-described animation effect for the material conveyance vehicle as a whole, all four components 401 to 404 need to be moved by the same distance in the same direction. Furthermore, the wheel components 402 and 403 need to be rotated. The material component 404 needs to be enlarged upward. In addition, the display colors of the cargo bed component 401 and the material component 404 need to be changed. It is possible to provide an animation effect to each of the components 401 to 404 and cooperate the animation effects among the components. However, with this method, as the number of components increases, the number of operations for cooperating animation effects increases and the man-hour of application development increases.

The present SCADA web HMI system produces an integrated component by grouping a plurality of components. Then, the integrated component is provided with an animation effect that is applied to the integrated component as a whole but not individually applied to components included in the integrated component. For example, when an integrated component representing the entire cargo conveyance vehicle is produced by grouping the components 401 to 404 in the example illustrated in FIG. 1, an animation effect of movement is applied to the integrated component as a whole but not applied to the individual components 401 to 404. With such processing, it is possible to improve designing efficiency of an HMI screen.

In addition, in the present SCADA web HMI system, each component included in the integrated component is provided with an animation effect that is applied to the component but not applied to any other component included in the integrated component. For example, an animation effect of rotation is applied to the wheel components 402 and 403 but not applied to the cargo bed component 401 and the cargo component 404 in the example illustrated in FIG. 1. With such processing, it is possible to produce an HMI screen having high-level animation effects.

The configuration of the present SCADA web HMI system for achieving the above-described effects and processing performed by the present SCADA web HMI system will be described below in detail.

1-2. Entire System

Figure 2:
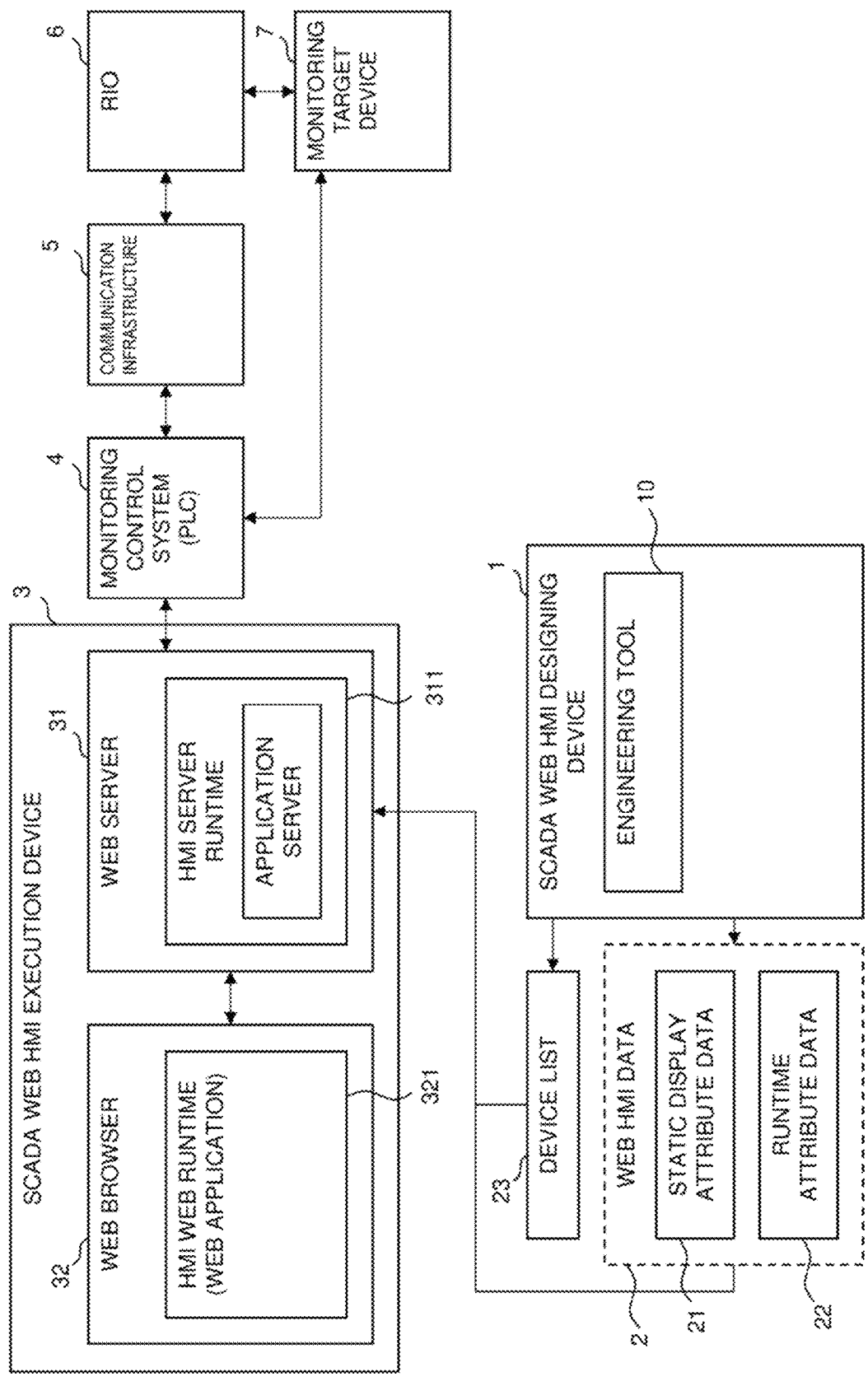
FIG. 2 is a diagram illustrating a system configuration of SCADA according to the first embodiment of the present invention.

FIG. 2 is a diagram illustrating a system configuration of SCADA. The SCADA includes a SCADA web HMI execution device 3, a monitoring control system 4, a communication infrastructure 5, and a RIO 6 as sub systems. The SCADA is connected to a monitoring target device 7 through the monitoring control system 4 or the RIO 6. In the present specification, a SCADA web HMI system includes the SCADA web HMI execution device 3 as an HMI execution environment and a SCADA web HMI designing device 1 as an HMI development environment.

Description related to the monitoring control system 4, the communication infrastructure 5, and the RIO 6 is same as description in the background art and thus omitted. The monitoring control system 4 includes a programmable logic controller (PLC). The monitoring target device 7 is, for example, a sensor or an actuator included in a monitoring control target plant.

The SCADA web HMI designing device 1 executes an engineering tool 10. The engineering tool 10 has a high-level drawing edit function, a function capable of storing drawing data in a scalable vector graphics (SVG) format, and an extended function. The drawing edit function and the SVG data store function are achieved by, for example, Microsoft Visio (registered trademark). The engineering tool 10 generates web HMI data 2 and a device list 23 that are necessary for functioning the SCADA web HMI execution device 3 as an HMI execution environment. In the SCADA web HMI designing device 1, a GUI is implemented as a user interface for executing the engineering tool 10. The SCADA web HMI designing device 1 will be described later in detail.

The SCADA web HMI execution device 3 (HMI sub system) includes a web server 31 and a web browser 32. In the SCADA web HMI execution device 3, an HMI server runtime 311 that operates on the web server 31 and an HMI web runtime 321 that operates on the web browser 32 cooperatively operate as an HMI sub system.

The web browser 32 displays an HMI screen that is a screen for monitoring the plant. Components that display the state of the plant are placed on the HMI screen. The web server 31 communicates with the web browser 32 and the monitoring control system 4. For example, when a PLC signal received from the monitoring control system 4 is a signal related to an HMI screen currently displayed on the web browser 32, the web server 31 transmits the PLC signal to the web browser 32. Accordingly, the SCADA web HMI execution device 3 changes the appearance of a component placed on the HMI screen in accordance with the value of the PLC signal received from the monitoring control system 4. The SCADA web HMI execution device 3 will be described later in detail.

Figure 3:
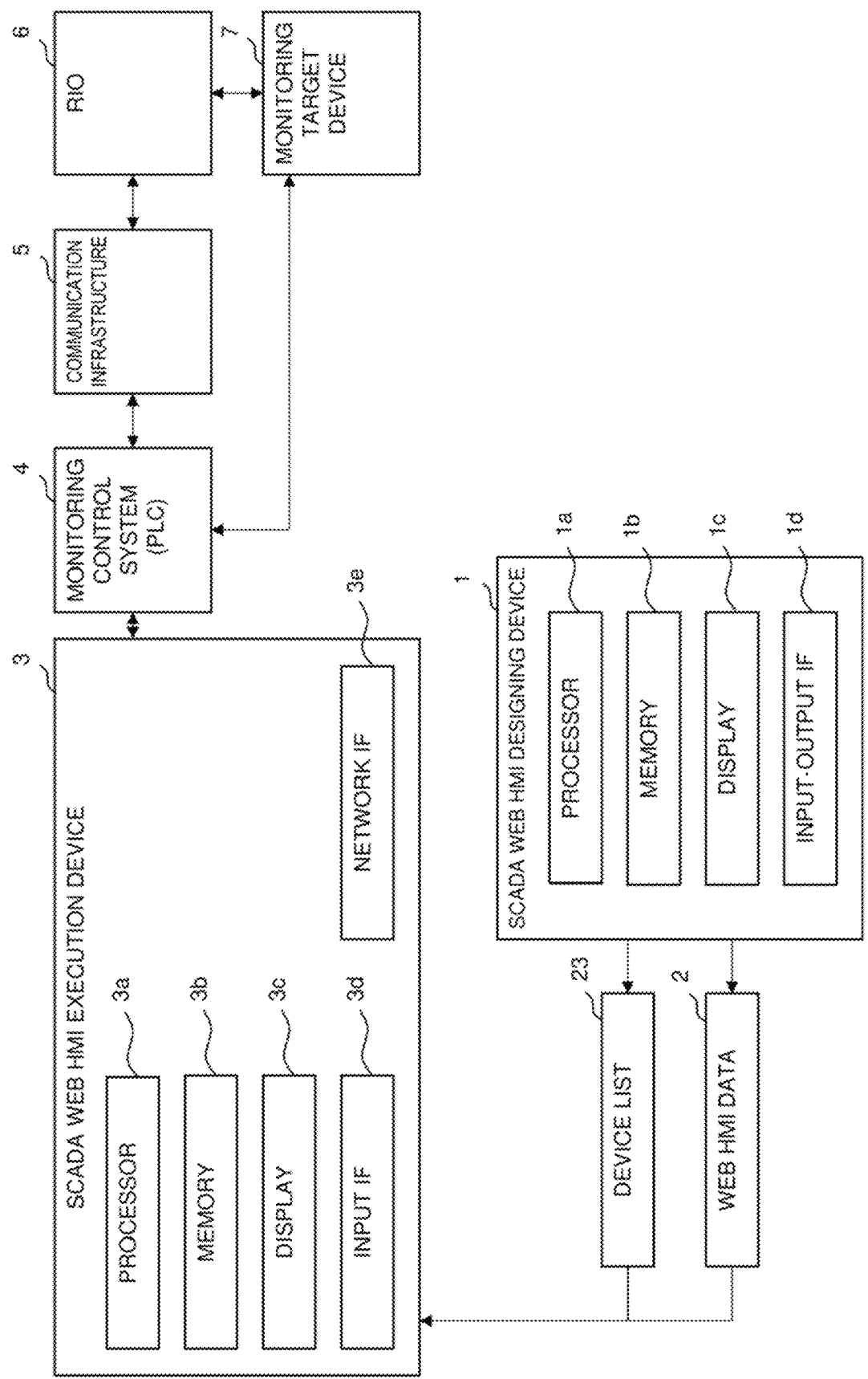
FIG. 3 is a block diagram illustrating an exemplary hardware configuration of a SCADA web HMI execution device and a SCADA web HMI designing device.

A hardware configuration of a main part of the SCADA web HMI system will be described below with reference to FIG. 3. FIG. 3 is a block diagram illustrating an exemplary hardware configuration of the SCADA web HMI system.

Each processing at the SCADA web HMI designing device 1 illustrated in FIG. 3 is achieved by a processing circuit. The processing circuit has a configuration in which a processor $1a$, a memory $1b$, a display $1c$, and an input-output interface $1d$ are connected to one another. The input-output interface $1d$ is an input device such as a keyboard or a mouse and is an output device capable of outputting the web HMI data 2 and the device list 23 as files. The processor $1a$ achieves each processing at the SCADA web HMI designing device 1 by executing various computer programs stored in the memory $1b$.

Each processing at the SCADA web HMI execution device 3 illustrated in FIG. 3 is achieved by a processing circuit. The processing circuit has a configuration in which a processor $3a$, a memory $3b$, a display $3c$, an input interface $3d$, and a network interface $3e$ are connected to one another. The input interface $3d$ includes an input device such as a keyboard or a mouse, and a device capable of reading the web HMI data 2 and the device list 23. The network interface $3e$ is a device connected to the monitoring control system 4 and capable of transmitting and receiving signal data and control commands. Furthermore, in the processing circuit, the processor $3a$ achieves each processing at the SCADA web HMI execution device 3 by executing various computer programs stored in the memory $3b$.

1-3. Processing by Engineering Tool

Figure 4:
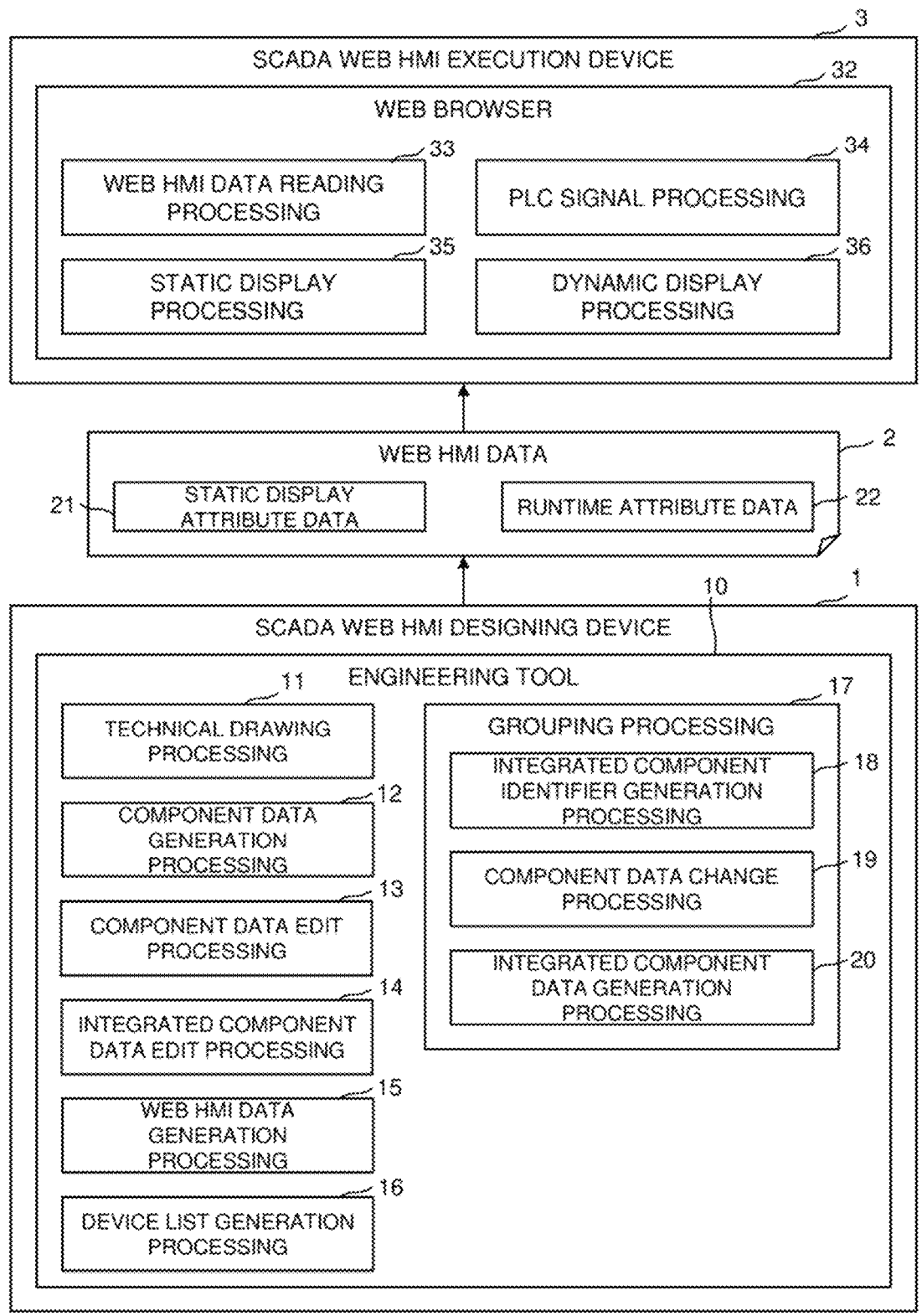
FIG. 4 is a block diagram for description of main processing executed at an engineering tool and a web browser according to the first embodiment of the present invention.

FIG. 4 is a block diagram for description of main processing executed at the engineering tool 10 and the web browser 32. The main processing executed at the engineering tool 10 includes technical drawing processing 11, component data generation processing 12, component data edit processing 13, integrated component data edit processing 14, web HMI data generation processing 15, device list generation processing 16, and a grouping processing 17. First, the contents of these pieces of processing by the engineering tool 10 will be described below.

1-3-1. Technical Drawing Processing

Figure 5:
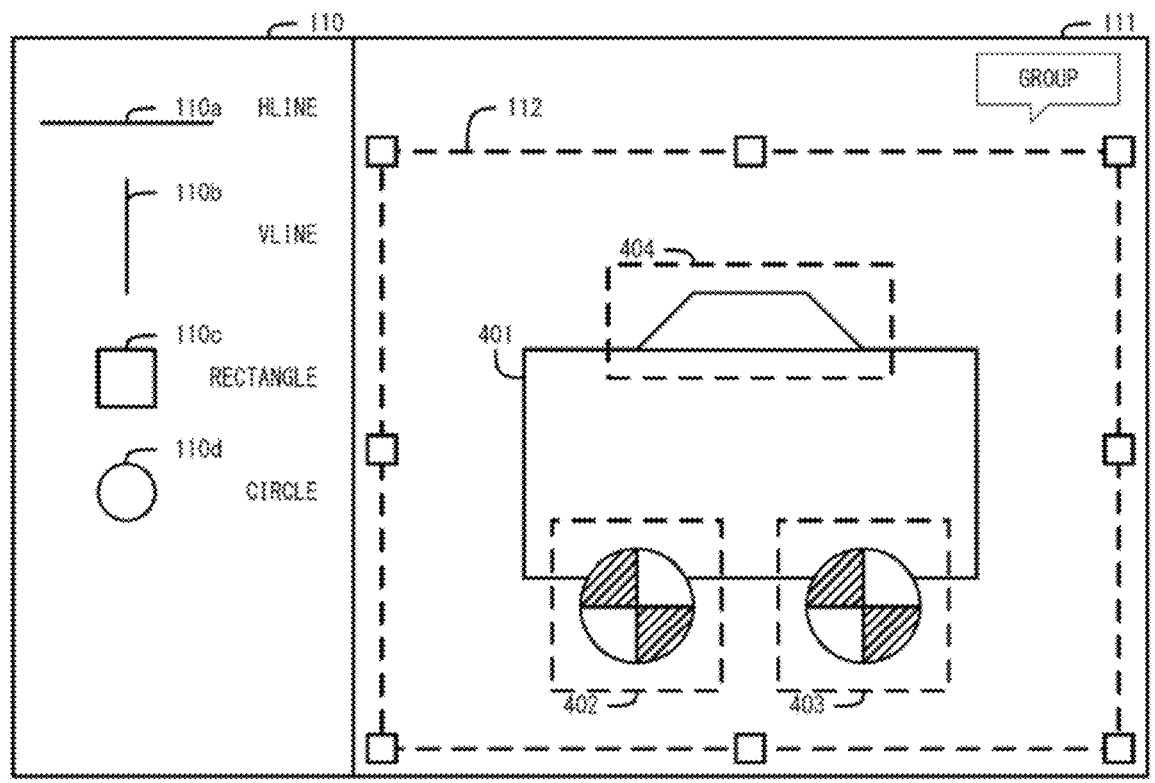
FIG. 5 is an exemplary drawing production screen displayed by the engineering tool according to the first embodiment of the present invention.

The technical drawing processing 11 for producing a drawing used as an HMI screen will be described below with reference to FIG. 5. FIG. 5 is an exemplary drawing production screen displayed by the engineering tool 10. The drawing production screen is displayed on the display 1c (refer to FIG. 3).

In the technical drawing processing 11, a stencil area 110 in which the master shapes of components necessary for producing a drawing are arrayed and a technical drawing area 111 in which an HMI screen drawing is drawn are displayed side by side on the drawing production screen. In the technical drawing processing 11, a component selected on the stencil area 110 by an HMI screen designer can be placed on the drawing in the technical drawing area 111 by using the input-output interface 1d (refer to FIG. 3).

In an example illustrated in FIG. 5, an HLINE 110a as the master shape of a horizontal line component, a VLINE 110b as the master shape of a vertical line component, a RECTANGLE 110c as the master shape of a rectangular component, and a CIRCLE 110d as the master shape of a circular component are displayed in the stencil area 110. However, the kinds of components are not limited thereto, and for example, the master shapes of a triangular component and a tire component may be displayed in the stencil area 110.

The HMI screen designer can copy a master shape on the stencil area 110 in FIG. 5 and place the copied master shape at an optional position on the technical drawing area 111 (drag and drop). A drawing is produced as a component is placed on the technical drawing area 111. The components 401 to 404 in FIG. 5 are produced as the HMI screen designer copies master shapes 110a to 110d of the components in the stencil area 110 and places the copied master shapes on the technical drawing area 111. A material conveyance vehicle schematic diagram is drawn on the technical drawing area 111 in FIG. 5.

1-3-2. Component Data Generation Processing

Subsequently, the component data generation processing 12 will be described below with reference to FIG. 4. In the component data generation processing 12, unique component data is automatically generated when a component is placed on the technical drawing area 111. Specifically, component data in which "disposition information", "component identifier", "attribute identifier", and "display information" of a component placed on the technical drawing area 111 are associated with one another is generated in the component data generation processing 12.

The "disposition information" is a static display attribute such as the shape, position, or size of a component placed on the technical drawing area 111. The static display attribute is information with which the appearance of the component does not change irrespective of the value of a received PLC signal. The static display attribute is changeable on the technical drawing area 111. The "component identifier" is a unique identifier that specifies each component placed on one drawing, and is, for example, a component number. The "attribute identifier" is an identifier that indicates a dynamic display attribute of the component. The "display information" is information that determines a display state of the component, which corresponds to an attribute value assigned to the attribute identifier. The display information is also referred to as a color rule in a case of a display color attribute.

The above-described attributes include an attribute that provides an animation effect to a component. Specifically, "display color", "scale", "position", "rotation", and "shear", which are attributes related to the appearance of a component, are attributes that provide an animation effect to the component. A GUI is used to set these attributes to a component. Furthermore, a plurality of attributes may be set to one component.

Figure 6:
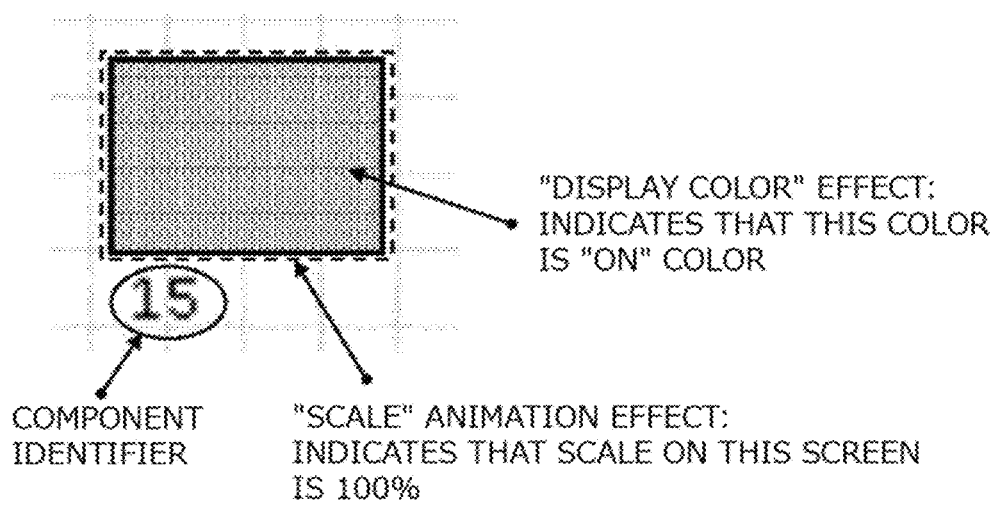
FIG. 6 is a diagram for description of a display color and a scale as attributes related to the appearance of a component.

In a case of "display color" attribute, a component is displayed on the technical drawing area 111 (refer to FIG. 5) in a color corresponding to on or off as in an example illustrated in FIG. 6. Furthermore, in a case of a "scale" attribute, a scale on the screen is 100% scale. In addition, a scaling ratio can be set with "scale". Note that, a number attached beside the component in FIG. 6 is the component identifier.

Figure 7:
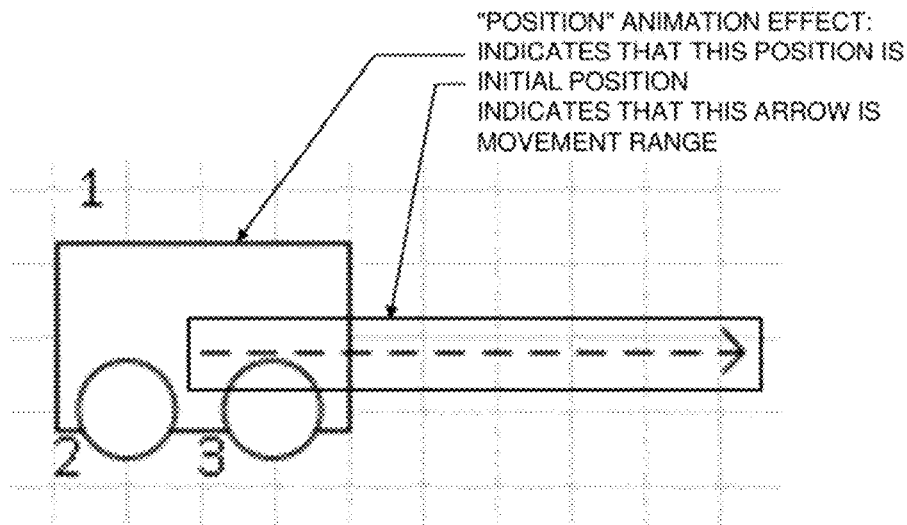
FIG. 7 is a diagram for description of a position as an attribute related to the appearance of a component.

In a case of a "position" attribute, a component is displayed at an initial position and a movement range is displayed with an arrow as in an example illustrated in FIG. 7.

Figure 8:
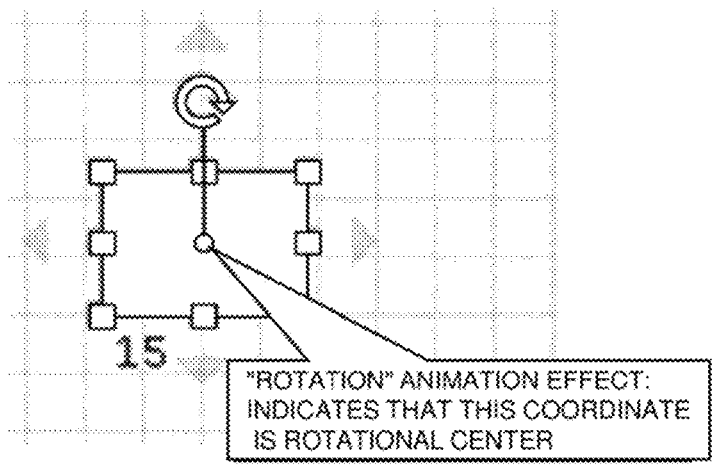
FIG. 8 is a diagram for description of rotation as an attribute related to the appearance of a component.

In a case of a "rotation" attribute, the rotational center of a component is displayed as in an example illustrated in FIG. 8. In addition, a rotational angle, a rotational direction, and a rotational speed can be set with "rotation".

Figure 9:
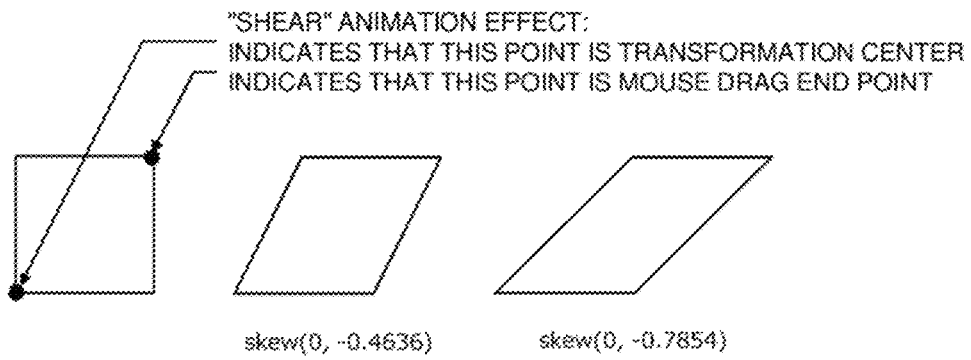
FIG. 9 is a diagram for description of shear as an attribute related to the appearance of a component.

In a case of a "shear" attribute, a central point and an operation point of a transformation are displayed as in an example illustrated in FIG. 9. It is possible to provide shear deformation to a figure by dragging the operation point with a mouse.

Among the above-described attributes, "scale", "position", "rotation", and "shear" are related to a figure transformation and are dynamic display attributes of a component. The figure transformation is typically performed by an affine transformation. In the present embodiment, basic transformations needed for SCADA display processing are selected from among affine transformations and provided as animation effects to an application developer. Each animation effect is provided by simple setting processing. The application developer specifies one or a plurality of animation effects necessary for each component, thereby achieving complicate animation that simulates the situation of the plant. When (x, y) represent coordinates on the screen before a transformation and (x', y') represent coordinates on the screen after the transformation, an affine transformation is expressed as a matrix transformation of Expression 1 below.

$$\begin{pmatrix} x' \\ y' \\ 1 \end{pmatrix} = \begin{pmatrix} a1 & a2 & a3 \\ b1 & b2 & b3 \\ 0 & 0 & 1 \end{pmatrix} \begin{pmatrix} x \\ y \\ 1 \end{pmatrix} \quad \text{Expression 1}$$

Scaling, rotation, translation, and shear are expressed in matrix transformations of Expressions 2, 3, 4, and 5 below, respectively, as subsets of the affine transformation.

$$\begin{pmatrix} x' \\ y' \\ 1 \end{pmatrix} = \begin{pmatrix} sx & 0 & 0 \\ 0 & sy & 0 \\ 0 & 0 & 1 \end{pmatrix} \begin{pmatrix} x \\ y \\ 1 \end{pmatrix} \quad \text{Expression 2}$$

$$\begin{pmatrix} x' \\ y' \\ 1 \end{pmatrix} = \begin{pmatrix} \cos\theta & -\sin\theta & 0 \\ \sin\theta & \cos\theta & 0 \\ 0 & 0 & 1 \end{pmatrix} \begin{pmatrix} x \\ y \\ 1 \end{pmatrix} \quad \text{Expression 3}$$

$$\begin{pmatrix} x' \\ y' \\ 1 \end{pmatrix} = \begin{pmatrix} 1 & 0 & tx \\ 0 & 1 & ty \\ 0 & 0 & 1 \end{pmatrix} \begin{pmatrix} x \\ y \\ 1 \end{pmatrix} \quad \text{Expression 4}$$

$$\begin{pmatrix} x' \\ y' \\ 1 \end{pmatrix} = \begin{pmatrix} 1 & \tan\alpha & 0 \\ \tan\beta & 1 & 0 \\ 0 & 0 & 1 \end{pmatrix} \begin{pmatrix} x \\ y \\ 1 \end{pmatrix} \quad \text{Expression 5}$$

The matrix transformations are expressed as scale(sx, sy), rorate(θ), translate(tx, ty), and skew(α, β), respectively. The application developer allocates signals from the PLC to the parameters sx, sy, θ, tx, ty, α, and β, thereby achieving an animation that changes motion in accordance with change of a PLC signal. Since a plurality of animation effects can be provided to one component, an affine transformation obtained by synthesizing the matrix transformations can be applied to the component.

In the component data generation processing 12, an "item name" that is unique in the system is generated as a combination of a screen identifier of an HMI screen, a component identifier, and an attribute identifier. The item name is a signal name corresponding to a PLC signal transmitted from the monitoring control system 4 to the SCADA web HMI execution device 3. The item name and the PLC signal are associated with each other in a one-to-one relation.

Figure 10:
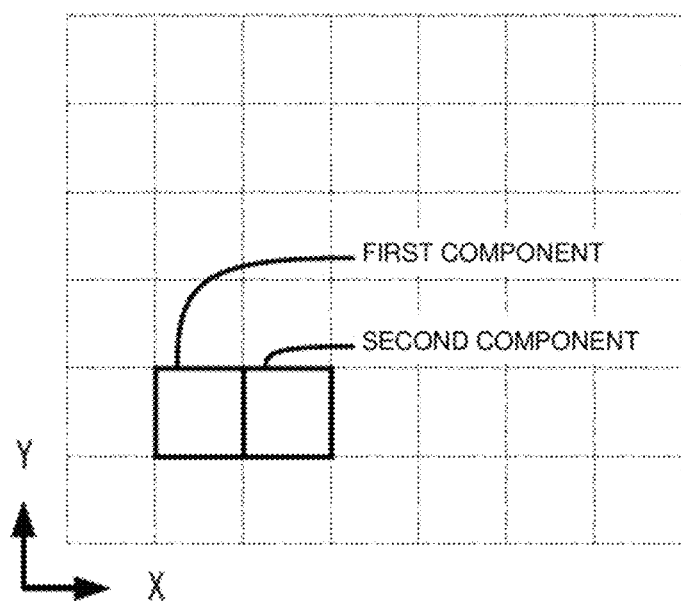
FIG. 10 is a diagram illustrating a first example of component data.
Figure 11:
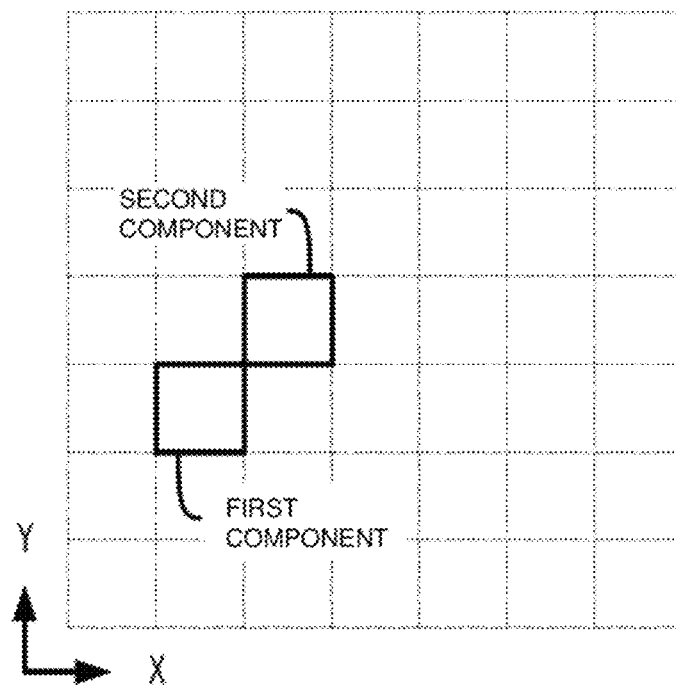
FIG. 11 is a diagram illustrating the first example of component data.

FIGS. 10 and 11 are diagrams illustrating a first example of component data in the present embodiment. The following description is made with an example in which a component indicating a first rectangle is placed as a "first component" and a component indicating a second rectangle is placed as a "second component". In each drawing, the position of each component on an XY plane is illustrated.

First component data 41 is component data of the first rectangle as the first component. A first component identifier is "component number 1". A first attribute identifier is "display position on the Y axis". First display information is "Change of the display position of the component on the Y axis in accordance with the value of a PLC signal". Furthermore, the item name "G1_1SL_MY" is an identifier as a combination of "G1" indicating the screen identifier of an HMI screen, "1" indicating component number 1, "SL" indicating the rectangular component, and "MY" indicating the display position on the Y axis.

Second component data 42 is component data of the second rectangle as the second component. A second component identifier is "component number 2". A second attribute identifier is "display position on the Y axis". Second display information is "change of the display position of the component on the Y axis in accordance with the value of a PLC signal". Furthermore, an item name "G1_2SL_MY" is an identifier as a combination of "G1" indicating the screen identifier of an HMI screen, "2" indicating component number 2, "SL" indicating the rectangular component, and "MY" indicating the display position on the Y axis.

Figure 12:
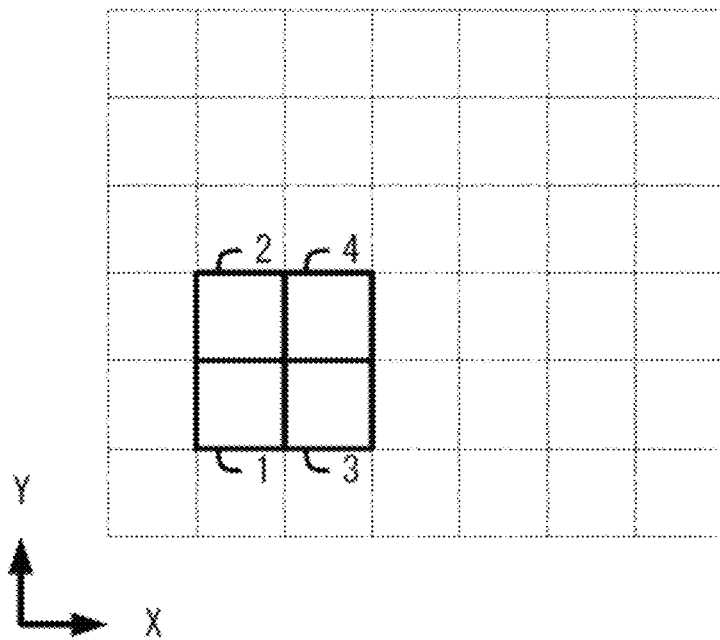
FIG. 12 is a diagram illustrating a second example of component data.
Figure 13:
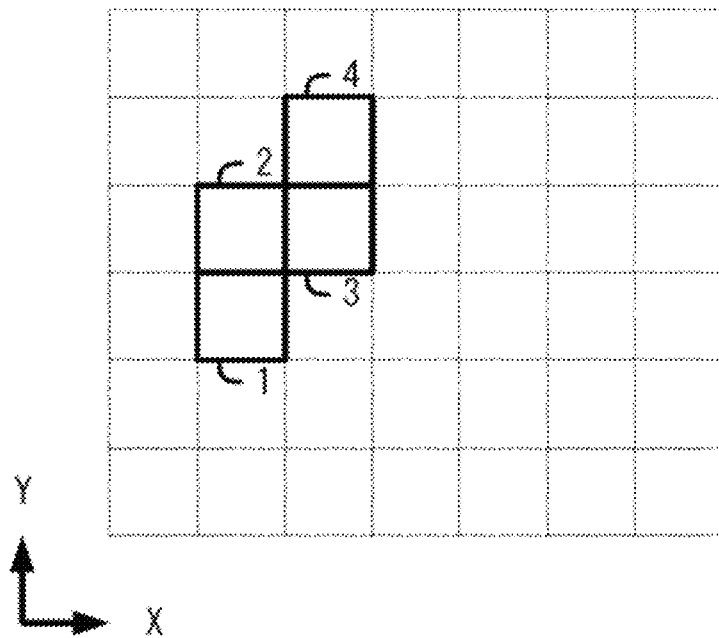
FIG. 13 is a diagram illustrating the second example of component data.

FIGS. 12 and 13 are diagrams illustrating a second example of component data in the present embodiment. In the second example, the number of components is larger than that in the first example. Specifically, a component indicating a third rectangle is newly placed as a "third component", and a component indicating a third rectangle is newly placed as a "fourth component". First component data 51 is same as the first component data 41 in the first example. Furthermore, second component data 52 is same as the second component data 42 in the first example. In each drawing, the position of each component on an XY plane is illustrated.

Third component data 53 is component data of the third rectangle as the third component. A third component identifier is "component number 3". A third attribute identifier is "display position on the Y axis". Third display information is "change of the display position of the component on the Y axis in accordance with the value of a PLC signal". Furthermore, an item name "G1_3SL_MY" is an identifier as a combination of "G1" indicating the screen identifier of an HMI screen, "3" indicating component number 3, "SL" indicating the rectangular component, and "MY" indicating the display position on the Y axis.

Fourth component data 54 is component data of the fourth rectangle as the fourth component. A fourth component identifier is "component number 4". A fourth attribute identifier is "display position on the Y axis". Fourth display information is "change of the display position of the component on the Y axis in accordance with the value of a PLC signal". Furthermore, the item name "G1_4SL_MY" is an identifier as a combination of "G1" indicating the screen identifier of an HMI screen, "4" indicating component number 4, "SL" indicating the rectangular component, and "MY" indicating the display position on the Y axis.

1-3-3. Component Data Edit Processing

Subsequently, the component data edit processing 13 will be described below with reference to FIG. 4. In the component data edit processing 13, component data automatically generated by the component data generation processing 12 is edited. The "display information" of the automatically generated component data has default contents, and thus the HMI screen designer edits the contents of the "display information" in accordance with HMI screen specifications of the monitoring control target plant.

1-3-4. Grouping Processing

Subsequently, the grouping processing 17 will be described below. To improve designing efficiency of an HMI screen having high-level animation effects, the engineering tool 10 groups a plurality of components on an HMI screen of the HMI sub system. The grouping is performed on the drawing production screen (refer to FIG. 5) displayed by the engineering tool 10.

The HMI screen designer selects a plurality of integration target components by using a range specification 112 illustrated with a dotted line frame in FIG. 5 and causes the engineering tool 10 to execute the grouping processing 17. Specifically, a plurality of components to be grouped are selected by using the range specification 112, and a "GROUP" menu from a menu list is selected to group the selected components.

A component that can be grouped is only a display component that changes its display state in accordance with a PLC signal transmitted from the monitoring control system 4 to the SCADA web HMI execution device 3. The display component has any of "display color", "non-display", "scale", "position", "rotation", and "shear" as attributes related to the appearance of the component and has any of "Boolean", "integer", and "floating number" as attribute value types. In other words, a component that can be grouped is only a component that can provide an animation effect. Note that a plurality of attributes among the above-described attributes related to the appearance of the component may be set to the display component.

Subsequently, the grouping processing 17 will be described below in detail. The grouping processing 17 includes integrated component identifier generation processing 18, component data change processing 19, and integrated component data generation processing 20.

First, as a first example of grouping processing, specific component data change when the first and second components illustrated in FIGS. 10 and 11 are grouped will be described below with reference to FIGS. 14 and 15.

In the grouping processing 17, first, the integrated component identifier generation processing 18 is performed. In the first example illustrated in FIGS. 14 and 15, an integrated component identifier "component number 10" is newly generated by the integrated component identifier generation processing 18. The identifier "component number 10" is provided to a tenth integrated component generated by grouping the first and second components.

Subsequently, the component data change processing 19 is performed. In the component data change processing 19, first component relation data of the first component data 41 is changed based on the relation between the first component and the integrated component of "component number 10". Specifically, information indicating that the first component is a child element of the tenth integrated component having the integrated component identifier "component number 10" is added to the first component relation data.

Furthermore, in the component data change processing 19, second component relation data of the second component data 42 is changed based on the relation between the second component and the integrated component of "component number 10". Specifically, information indicating that the second component is a child element of the integrated component having the integrated component identifier "component number 10" is added to the second component relation data.

Subsequently, the integrated component data generation processing 20 is performed. In the integrated component data generation processing 20, tenth integrated component data 43 illustrated in FIGS. 14 and 15 is generated. The tenth integrated component data 43 is constituent component data of the tenth integrated component generated by grouping the first and second components. In the tenth integrated component data 43, "disposition information", "component identifier", "attribute identifier", and "display information" of the tenth integrated component are associated with one another. Furthermore, in the integrated component data generation processing 20, an integrated component item name is generated as a combination of the screen identifier of an HMI screen, an integrated component identifier, and an attribute identifier.

The attribute identifier of the tenth integrated component included in the tenth integrated component data 43 is "display position on the X axis". The display information of the tenth integrated component is "change of the display position of the integrated component on the X axis in accordance with the value of a PLC signal". The relation data of the tenth integrated component is "the tenth integrated component is the parent element of the first and second components". Furthermore, an item name "G1_10SL_MX" is an identifier as a combination of the screen identifier "G1" of an HMI screen, "10" indicating the integrated component identifier "component number 10", "SL" indicating the integrated component, and "MX" indicating the attribute identifier "display position on the X axis". The item name of the integrated component is associated with a PLC signal in a one-to-one relation.

Figure 14:
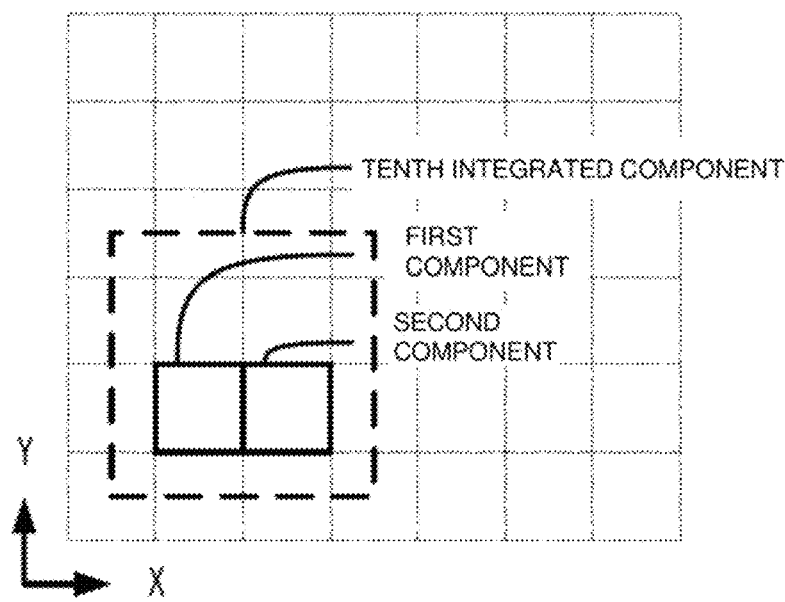
FIG. 14 is a diagram illustrating a first example of grouping processing.
Figure 15:
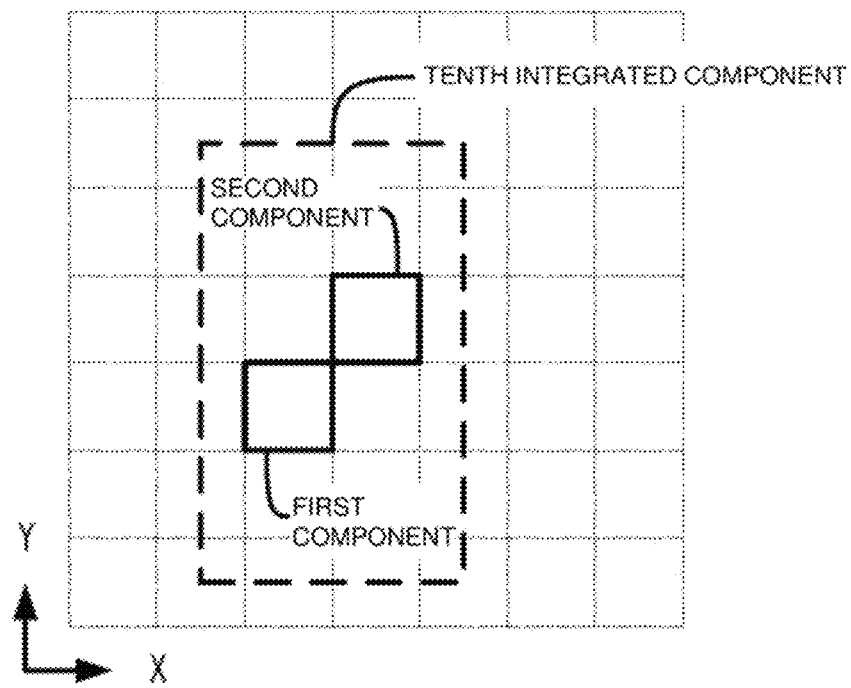
FIG. 15 is a diagram illustrating the first example of grouping processing.

In this manner, in the first example of grouping processing, the first and second components illustrated in FIGS. 10 and 11 are grouped as child elements of the tenth integrated component illustrated in FIGS. 14 and 15, and the tenth integrated component data is generated.

Subsequently, as a second example of grouping processing, specific component data change when the first to fourth components illustrated in FIGS. 11 and 12 are hierarchically grouped will be described below with reference to FIGS. 16 and 17.

First, an integrated component identifier "component number 10" and an integrated component identifier "component number 20" are newly generated by the integrated component identifier generation processing 18. The identifier "component number 10" is provided to a tenth integrated component generated by grouping the first and second components. The identifier "component number 20" is provided to a twentieth integrated component generated by grouping the third and fourth components.

Subsequently, in the component data change processing 19, information indicating that the first component is a child element of the tenth integrated component having the integrated component identifier "component number 10" is added to first component relation data of the first component data 51. Information indicating that the second component is a child element of the tenth integrated component having the integrated component identifier "component number 10" is added to second component relation data of the second component data 52. Furthermore, information indicating that the third component is a child element of the twentieth integrated component having the integrated component identifier "component number 20" is added to third component relation data of the third component data 53. Information indicating that the fourth component is a child element of the tenth integrated component having the integrated component identifier "component number 20" is added to fourth component relation data of the fourth component data 54.

Subsequently, in the integrated component data generation processing 20, tenth integrated component data 55 is generated. The tenth integrated component data 55 is constituent component data of the tenth integrated component having the first and second components as child elements. The attribute identifier of the tenth integrated component included in the tenth integrated component data 55 is "display position on the Y axis". The display information of the tenth integrated component is "change of the display position of the component on the Y axis in accordance with the value of a PLC signal". Information indicating that the tenth integrated component is the parent element of the first and second components is input to tenth component relation data of the tenth integrated component data 55. The item name "G1_10SL_MY" is an identifier as a combination of the screen identifier "G1" of an HMI screen, "10" indicating the integrated component identifier "component number 10", "SL" indicating the integrated component, and "MY" indicating the attribute identifier "display position on the Y axis".

Furthermore, in the integrated component data generation processing 20, twentieth integrated component data 56 is generated. The twentieth integrated component data 56 is constituent component data of the twentieth integrated component having the third and fourth components as child elements. The attribute identifier of the twentieth integrated component included in the twentieth integrated component data 56 is "display position on the Y axis". The display information of the twentieth integrated component is "change of the display position of the component on the Y axis in accordance with the value of a PLC signal". Information indicating that the twentieth integrated component is the parent element of the third and fourth components is input to twentieth component relation data of the twentieth integrated component data 56. The item name "G1_20SL_MY" is an identifier as a combination of the screen identifier "G1" of an HMI screen, "20" indicating the integrated component identifier "component number 20", "SL" indicating the integrated component, and "MY" indicating the attribute identifier "display position on the Y axis".

In addition, the tenth integrated component and the twentieth integrated component are further grouped in the second example. For this further grouping, an integrated component identifier "component number 100" is newly generated by the integrated component identifier generation processing 18. The identifier "component number 100" is provided to a hundredth integrated component as a duplicate integrated component generated by grouping the tenth integrated component and the twentieth integrated component.

Subsequently, in the component data change processing 19, information indicating that the tenth integrated component is a child element of the hundredth integrated component having the integrated component identifier "component number 100" is added to tenth integrated component relation data of the tenth integrated component data 55. Furthermore, information indicating that the twentieth integrated component is a child element of the hundredth integrated component having the integrated component identifier "component number 100" is added to twentieth integrated component relation data of the twentieth integrated component data 56.

Subsequently, in the integrated component data generation processing 20, hundredth integrated component data 57 is generated. The hundredth integrated component data 57 is constituent component data of the hundredth integrated component having the tenth integrated component and the twentieth integrated component as child elements. The attribute identifier of the hundredth integrated component included in the hundredth integrated component data 57 is "display position on the X axis". The display information of the hundredth integrated component is "change of the display position of the component on the X axis in accordance with the value of a PLC signal". Information indicating that the hundredth integrated component is the parent element of the tenth integrated component and the twentieth integrated component is input to hundredth component relation data of the hundredth integrated component data 57. The item name "G1_100SL_MY" is an identifier as a combination of the screen identifier "G1" of an HMI screen, "100" indicating the integrated component identifier "component number 100", "SL" indicating the integrated component, and "MX" indicating the attribute identifier "display position on the X axis".

In this manner, in the second example of grouping processing, the first and second components illustrated in FIGS. 12 and 13 are grouped as child elements of the tenth integrated component illustrated in FIGS. 14 and 15, and the tenth integrated component data is generated. Furthermore, the third and fourth components illustrated in FIGS. 12 and 13 are grouped as child elements of the twentieth integrated component illustrated in FIGS. 16 and 17, and the twentieth integrated component data is generated. In addition, the tenth integrated component data and the twentieth integrated component data are grouped as child elements of the hundredth integrated component, and the hundredth integrated component data is generated.

1-3-5. Integrated Component Data Edit Processing

Subsequently, the integrated component data edit processing 14 will be described below with reference to FIG. 4. In the integrated component data edit processing 14, component data automatically generated by the integrated component data generation processing 20 is edited. The "display information" of the automatically generated integrated component data has default contents, and thus the HMI screen designer edits the contents of "display information" in accordance with HMI screen specifications of the monitoring control target plant.

1-3-6. Flowchart of Grouping Processing

Figure 18:
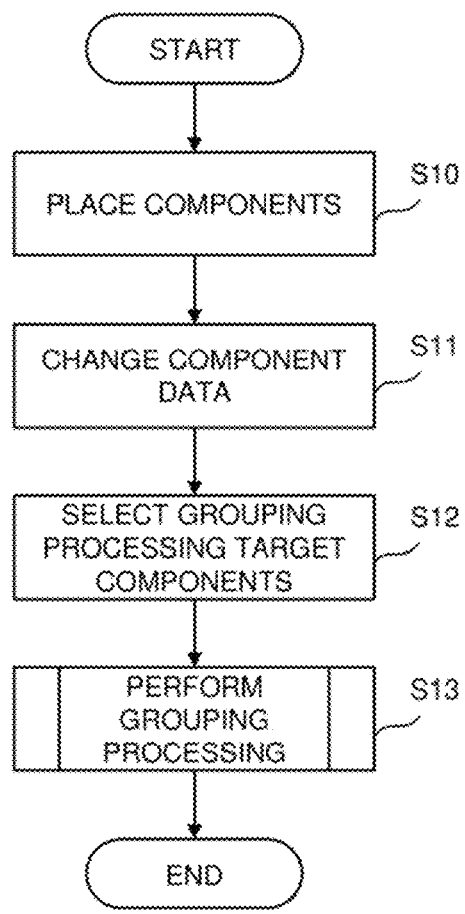
FIG. 18 is a flowchart for description of the process of grouping processing using the engineering tool according to the first embodiment of the present invention.
Figure 19:
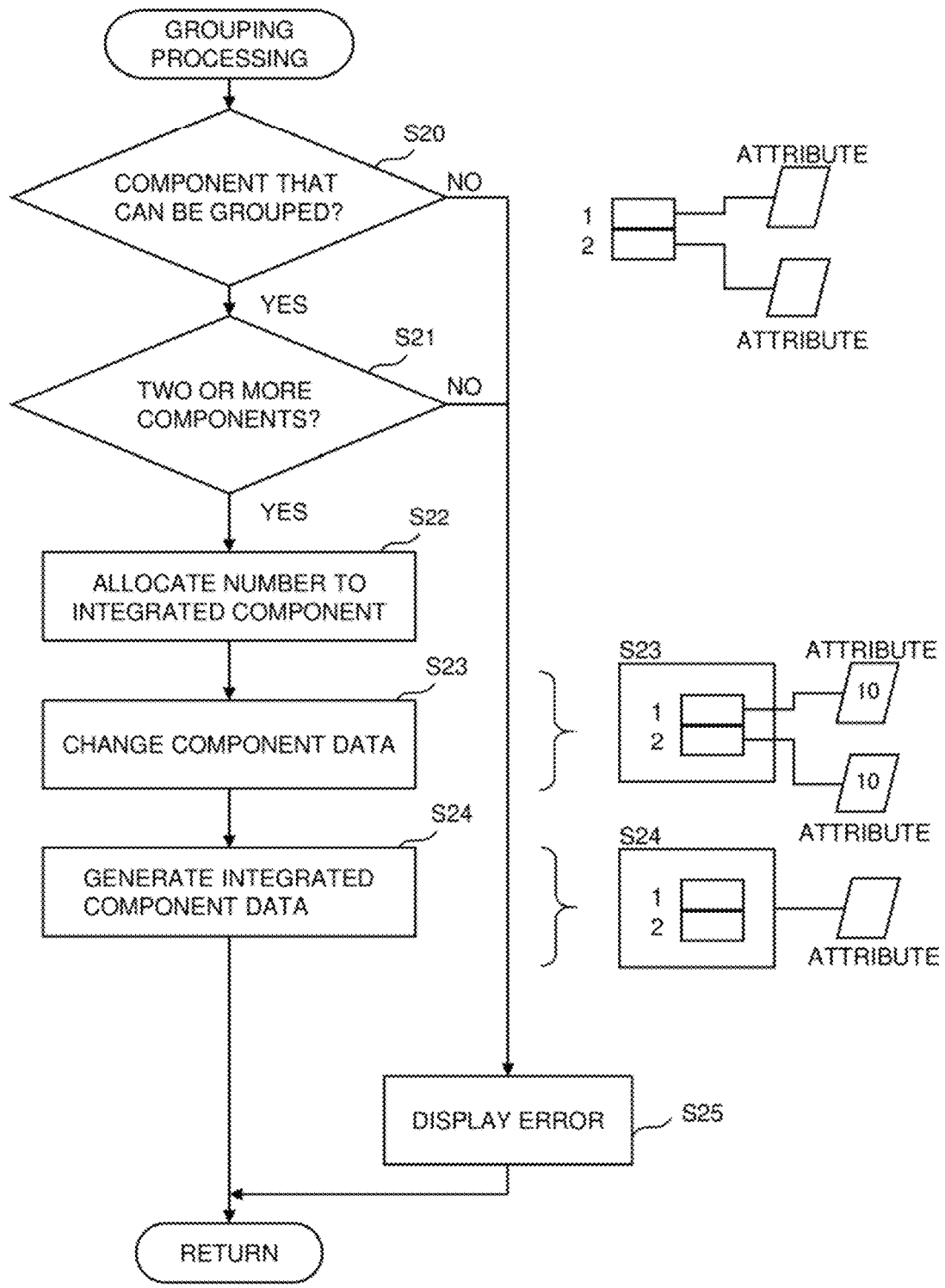
FIG. 19 is a flowchart for description of the process of grouping processing using the engineering tool according to the first embodiment of the present invention.

FIGS. 18 and 19 are flowcharts for description of the process of the grouping processing 17 using the engineering tool 10.

First at step S10 in FIG. 18, the HMI screen designer places a component included in an HMI screen on the technical drawing area 111 by using the engineering tool 10. When the component is placed on the technical drawing area 111, unique component data is automatically generated by the component data generation processing 12.

At step S11, the HMI screen designer changes the display information of the component data in accordance with HMI screen specifications of the monitoring control target plant. For example, the display color of the component in a case of an attribute value "0", the display color of the component in a case of an attribute value "1", and the existence of a flicker attribute are changed for the display information related to the attribute identifier "display color". Note that the attribute value corresponds to the value of a PLC signal.

At step S12, the HMI screen designer selects a grouping processing target component by using the range specification 112 in FIG. 5.

At step S13, the HMI screen designer executes the grouping processing 17 by using the engineering tool 10. In the grouping processing 17, a grouping processing subroutine illustrated in FIG. 19 is executed. The process of the grouping processing 17 will be described below with reference to FIG. 19.

First at step S20, it is determined whether the selected component is a component that can be grouped. A component that can be grouped is a display component that changes its display state in accordance with a PLC signal transmitted from the monitoring control system 4 to the SCADA web HMI execution device 3. When the selected component is a component that can be grouped, a determination condition is satisfied. When the determination condition is satisfied, processing at step S21 is executed next.

At step S21, it is determined whether two or more components are selected. When two or more components are selected, a determination condition is satisfied. When the determination condition is satisfied, processing at step S22 is executed next.

At step S22, new component numbers are allocated. A new integrated component identifier is allocated to each constituent component data of an integrated component.

At step S23, information indicating that a selected component is a child element of an integrated component is added to constituent component data of each selected component. Note that a rectangle denoted by number 1 in the drawing is an image of the first component in the above-described first example, and a rectangle denoted by number 2 is an image of the second component. A rectangle surrounding the rectangle of the first component and the rectangle of the second component is an image of the tenth integrated component. A parallelogram associated with the rectangle of the first component is an image of data of the first component, and a parallelogram associated with the rectangle of the second component is an image of data of the second component. Number 10 in each parallelogram means that information indicating that the corresponding selected component (first component or second component) is a child element of the tenth integrated component is added to component data of the component.

At step S24, data of the integrated component is generated. Note that a parallelogram associated with the rectangle surrounding the rectangle of the first component and the rectangle of the second component is an image of data of the tenth integrated component.

When the determination condition is not satisfied in the above-described processing at step S20 or S21, the engineering tool 10 causes the display 1c to display that each selected component cannot be integrated at step S25.

After step S24 or S25, the grouping processing subroutine in FIG. 19 ends. In the above-described first example, the grouping processing subroutine is performed once to produce the tenth integrated component. In the above-described second example, the grouping processing subroutine is performed three times to produce the tenth integrated component, the twentieth integrated component, and the hundredth integrated component. Thereafter, the routine in FIG. 18 ends.

After execution of the routine in FIG. 18, the web HMI data generation processing 15 and the device list generation processing 16 to be described later are executed. Accordingly, in the above-described first example, the web HMI data 2 and the device list 23 are generated for the first component, the second component, and the tenth integrated component. Furthermore, in the above-described second example, the web HMI data 2 and the device list 23 are generated for the first component, the second component, the third component, the fourth component, the tenth integrated component, the twentieth integrated component, and the hundredth integrated component.

1-3-7. Web HMI Data Generation Processing

Subsequently, the web HMI data generation processing 15 will be described below with reference to FIG. 4. In the web HMI data generation processing 15, the web HMI data 2 is generated. The web HMI data 2 includes static display attribute data 21 and runtime attribute data 22. The static display attribute is information with which the appearance of a component does not change irrespective of the value of a received PLC signal. For example, the static display attribute is disposition information such as the shape, position, or size of the component. The runtime attribute is information for changing the appearance of a component in accordance with the value of a received PLC signal. Specifically, the runtime attribute is the correspondence between a PLC signal and each of the color attribute, the type of a subset transformation of an affine transformation, and a parameter of the transformation.

The static display attribute data 21 is data in which the disposition information and item name of a component are associated with each other. The static display attribute data 21 is data in a scalable vector graphics (SVG) format and includes the disposition information of the component as an attribute of a SVG element. Specifically, the disposition information of the component is the shape, position, and size thereof.

In the case of the first example illustrated in FIGS. 14 and 15, the static display attribute data 21 includes data listed below:
Data in which the item name "G1_1SL_MY" and the disposition information of the first component are associated with each other,
Data in which the item name "G1_2SL_MY" and the disposition information of the second component are associated with each other, and
Data in which the item name "G1_10SL_MX" and the disposition information of the tenth integrated component are associated with each other.

In the case of the second example illustrated in FIGS. 16 and 17, the static display attribute data 21 includes data listed below:
Data in which the item name "G1_1SL_MY" and the disposition information of the first component are associated with each other,
Data in which the item name "G1_2SL_MY" and the disposition information of the second component are associated with each other,
Data in which the item name "G1_3SL_MY" and the disposition information of the third component are associated with each other,
Data in which the item name "G1_4SL_MY" and the disposition information of the fourth component are associated with each other,
Data in which the item name "G1_10SL_MY" and the disposition information of the tenth integrated component are associated with each other,
Data in which the item name "G1_20SL_MY" and the disposition information of the twentieth integrated component are associated with each other, and
Data in which item name "G1_100SL_MX" and the disposition information of the hundredth integrated component are associated with each other.

The runtime attribute data 22 is the correspondence between a PLC signal and the display information of a component, in other words, the color attribute and the type of a subset transformation of an affine transformation.

In the case of the first example illustrated in FIGS. 14 and 15, the display information of a component includes information listed below:
First display information of the first component, namely, "change of the display position of the component on the Y axis in accordance with the value of a PLC signal",
Second display information of the second component, namely, "change of the display position of the component on the Y axis in accordance with the value of a PLC signal", and
Tenth display information of the tenth integrated component, namely, "change of the display position of the integrated component on the X axis in accordance with the value of a PLC signal".

In the case of the second example illustrated in FIGS. 16 and 17, the display information of a component includes information listed below:
First display information of the first component, namely, "change of the display position of the component on the Y axis in accordance with the value of a PLC signal",
Second display information of the second component, namely, "change of the display position of the component on the Y axis in accordance with the value of a PLC signal",
Third display information of the third component, namely, "change of the display position of the component on the Y axis in accordance with the value of a PLC signal",
Fourth display information of the fourth component, namely, "change of the display position of the component on the Y axis in accordance with the value of a PLC signal",
Tenth display information of the tenth integrated component, namely, "change of the display position of the integrated component on the Y axis in accordance with the value of a PLC signal", Twentieth display information of the twentieth integrated component, namely, "change of the display position of the integrated component on the Y axis in accordance with the value of a PLC signal", and Hundredth display information of the hundredth integrated component, namely, "change of the display position of the integrated component on the X axis in accordance with the value of a PLC signal".

The runtime attribute data 22 includes information that the figure transformation is the matrix transformation of translate(tx, ty) as a subset of an affine transformation. Furthermore, information of the correspondence between the parameters tx and ty of the matrix transformation and a PLC signal is included. A dynamic display processing unit 36 operating on the web browser 32 changes the display state of a component in accordance with a PLC signal received from the monitoring control system 4 by using a JavaScript (registered trademark) program based on the information.

In the first example illustrated in FIGS. 14 and 15, since the first and second components are rectangular components and the tenth integrated component is an integrated component, the runtime attribute data 22 includes definitions of transformations of a rectangular component and an integrated component. The dynamic display processing unit 36 operations as follows based on the transformation definitions included in the runtime attribute data 22 in the first example.

A transformation definition is applied to the first component when the item name "G1_1SL_MY" and the first display information are applied as setting parameters. The dynamic display processing unit 36 changes the display position of the first component on the Y axis in accordance with the value of a PLC signal. The transformation definition of the first component is applied to the first component but not applied to any other constituent component of the tenth integrated component except for the first component.

A transformation definition is applied to the second component when the item name "G1_2SL_MY" and the second display information are applied as setting parameters. The dynamic display processing unit 36 changes the display position of the second component on the Y axis in accordance with the value of a PLC signal. The transformation definition of the second component is applied to the second component but not applied to any other constituent component of the tenth integrated component except for the second component.

A transformation definition is applied to the tenth integrated component when the item name "G1_10SL_MX" and the tenth display information are applied as setting parameters. Specifically, the transformation definition is used as a definition of a transformation that changes the display state of the first component as a child element of the tenth integrated component, and is used as a definition of a transformation that changes the display state of the second component as a child element of the tenth integrated component. The dynamic display processing unit 36 changes the display position of the first component on the X axis in accordance with the value of a PLC signal and also changes the display position of the second component on the X axis in accordance with the value of a PLC signal. The transformation definition of the tenth integrated component is applied to the tenth integrated component as a whole but not individually applied to the constituent components of the tenth integrated component.

In the second example illustrated in FIGS. 16 and 17, since the first component, the second component, the third component, and the fourth component are rectangular components, and the tenth integrated component, the twentieth integrated component, and the hundredth integrated component are integrated components, the runtime attribute data 22 includes definitions of transformations of a rectangular component and an integrated component. The dynamic display processing unit 36 operates as follows based on the transformation definitions included in the runtime attribute data 22 in the second example.

A transformation definition is applied to the first component when the item name "G1_1SL_MY" and the first display information are applied as setting parameters. The dynamic display processing unit 36 changes the display position of the first component on the Y axis in accordance with the value of a PLC signal. The transformation definition of the first component is applied to the first component but not applied to any other constituent component of the tenth integrated component except for the first component.

A transformation definition is applied to the second component when the item name "G1_2SL_MY" and the second display information are applied as setting parameters. The dynamic display processing unit 36 changes the display position of the second component on the Y axis in accordance with the value of a PLC signal. The transformation definition of the second component is applied to the second component but not applied to any other constituent component of the tenth integrated component except for the second component.

A transformation definition is applied to the third component when the item name "G1_3SL_MY" and the third display information are applied as setting parameters. The dynamic display processing unit 36 changes the display position of the third component on the Y axis in accordance with the value of a PLC signal. The transformation definition of the third component is applied to the third component but not applied to any other constituent component of the twentieth integrated component except for the third component.

A transformation definition is applied to the fourth component when the item name "G1_4SL_MY" and the fourth display information are applied as setting parameters. The dynamic display processing unit 36 changes the display position of the fourth component on the Y axis in accordance with the value of a PLC signal. The transformation definition of the fourth component is applied to the fourth component but not applied to any other constituent component of the twentieth integrated component except for the fourth component.

A transformation definition is applied to the tenth integrated component when the item name "G1_10SL_MY" and the tenth display information are applied as setting parameters. Specifically, the transformation definition is used as a definition of a transformation that changes the display state of the first component as a child element of the tenth integrated component, and is used as a definition of a transformation that changes the display state of the second component as a child element of the tenth integrated component. The dynamic display processing unit 36 changes the display position of the first component on the Y axis in accordance with the value of a PLC signal, and also changes the display position of the second component on the Y axis in accordance with the value of a PLC signal. The transformation definition of the tenth integrated component is applied to the tenth integrated component as a whole but not individually applied to the constituent components of the tenth integrated component. Furthermore, the transformation definition of the tenth integrated component is applied to the tenth integrated component but not applied to any other constituent component of the hundredth integrated component except for the tenth integrated component.

A transformation definition is applied to the twentieth integrated component when the item name "G1_20SL_MY" and the twentieth display information are applied as setting parameters. Specifically, the transformation definition is used as a definition of a transformation that changes the display state of the third component as a child element of the twentieth integrated component, and is used as a definition of a transformation that changes the display state of the fourth component as a child element of the twentieth integrated component. The dynamic display processing unit 36 changes the display position of the third component on the Y axis in accordance with the value of a PLC signal, and also changes the display position of the fourth component on the Y axis in accordance with the value of a PLC signal. The transformation definition of the twentieth integrated component is applied to the twentieth integrated component as a whole but not individually applied to the constituent components of the twentieth integrated component. Furthermore, the transformation definition of the twentieth integrated component is applied to the twentieth integrated component but not applied to any other constituent component of the hundredth integrated component except for the twentieth integrated component.

A transformation definition is applied to the hundredth integrated component when the item name "G1_100SL_MX" and the hundredth display information are applied as setting parameters. Specifically, the transformation definition is used as a definition of a transformation that changes the display state of the tenth integrated component as a child element of the hundredth integrated component, and is used as a definition of a transformation that changes the display state of the twentieth integrated component as a child element of the hundredth integrated component. The dynamic display processing unit 36 changes the display position of the tenth integrated component on the X axis in accordance with the value of a PLC signal, and also changes the display position of the twentieth integrated component on the X axis in accordance with the value of a PLC signal. The transformation definition of the hundredth integrated component as a duplicate integrated component is applied to the hundredth integrated component as a whole but not individually applied to the constituent components of the hundredth integrated component.

1-3-8. Device List Generation Processing

Subsequently, the device list generation processing 16 will be described below with reference to FIG. 4. In the device list generation processing 16, the device list 23 as a list of data in which an item name and a PLC signal are associated with each other is generated for each component. In the device list 23, an item name and a PLC signal (PLC address for receiving the PLC signal) are associated with each other in a one-to-one relation. The device list is read by the web server 31 and used to transmit and receive signals between the web browser 32 and the monitoring control system 4.

In the case of the above-described first example, before the grouping processing 17 is executed, two item names are listed as illustrated in FIGS. 10 and 11, and two PLC signals are needed. After the grouping processing 17 is executed, the item name of an integrated component is added to the two item names as illustrated in FIGS. 14 and 15, and three PLC signals are needed.

In the case of the above-described second example, before the grouping processing 17 is executed, four item names are listed as illustrated in FIGS. 12 and 13, and four PLC signals are needed. After the grouping processing 17 is executed, the item names of three integrated components are added to the four item names as illustrated in FIGS. 16 and 17, and seven PLC signals are needed.

1-4. SCADA Web HMI Execution Device (HMI Sub System)

Subsequently, the SCADA web HMI execution device 3 will be described below with reference to FIG. 2. As described above, the SCADA web HMI execution device 3 includes the web server 31 and the web browser 32.

1-4-1. Web Server

The web server 31 reads the web HMI data 2 and the device list 23. The web server 31 reads the web HMI data 2 and places the static display attribute data 21 and the runtime attribute data 22 as HMI web runtime contents. The web server 31 reads the device list 23 and enables signal transmission and reception between the web browser 32 and the monitoring control system 4.

Processing by the HMI server runtime 311 operating on the web server 31 is as follows.
 (1) Supply of the HMI web runtime contents to the web browser 32 through a built-in application server.
 (2) Through communication with the monitoring control system 4, transmission of signal data from the monitoring target device 7 to the HMI web runtime 321 and transmission of a control command from the HMI web runtime 321 to the monitoring control system 4.

1-4-2. Web Browser

Subsequently, processing by the web browser 32 will be described below. The web browser 32 can read the web HMI data 2 (the static display attribute data 21 and the runtime attribute data 22) and execute static display processing and dynamic display processing. In the static display processing, the web browser 32 reads the static display attribute data 21 as drawing data in the SVG format from the web server 31 and displays an HMI screen.

In the dynamic display processing, the web browser 32 reads the runtime attribute data 22. Transformation definitions, the item names and display information of components, and the item names and display information of integrated components, which are included in the runtime attribute data 22 are applied as setting parameters to a JavaScript (registered trademark) computer program. When these pieces of information are applied as setting parameters, the display state of any component is changed in accordance with a PLC signal received from the monitoring control system 4. Specifically, when a received integrated component corresponds to the item name of a component, the display state of the component is updated based on the display information thereof in accordance with the value of a received PLC signal. Furthermore, when a received PLC signal corresponds to the item name of an integrated component, the display state of the integrated component is updated based on the display information thereof in accordance with the value of a received PLC signal.

In the case of the above-described first example, in the static display processing, the first and second components are placed on an HMI screen as illustrated in FIG. 14 in accordance with the disposition information thereof.

In the dynamic display processing, a transformation defined for the first component, a transformation defined for the second component, and a transformation defined for the tenth integrated component are executed on the web browser 32. In this case, a transformation defined for the tenth integrated component as an integrated component is executed first, and subsequently, the transformations defined for the first and second components as constituent components of the integrated component are executed. This means that Expression 6 below is satisfied, when A represents a matrix that transforms the figure of each component, B represents a matrix that transforms the figure of the integrated component, X represents a vector of the component before the transformation, and X' represents a vector thereof after the transformation.

$$X'=ABX \qquad \text{Expression 6}$$

Accordingly, as illustrated in FIG. 15, the display positions of the first and second components on the X and Y axes are changed in accordance with the values of PLC signals. More specific description is given below.

In the first example, according to the transformation definition of the tenth integrated component, the display position of the tenth integrated component on the X axis is changed in accordance with the value of a PLC signal. In FIG. 14, which illustrates an initial state, the value of a PLC signal transmitted to the item of the tenth integrated component is "0" (G1_10SL_MX=0). In this case, the tenth integrated component is displayed at a position on the X axis in the technical drawing area 111. In other words, the first and second components as child elements of the tenth integrated component are displayed at positions on the X axis in the technical drawing area 111.

Subsequently, the value of a PLC signal transmitted to the item of the tenth integrated component becomes "1" (G1_10SL_MX=1) as in FIG. 15. Accordingly, the tenth integrated component is displayed at a position shifted from its position in the technical drawing area 111 by one in the X-axis direction. In other words, the first and second components as child elements of the tenth integrated component are displayed at positions shifted from their positions in the technical drawing area 111 by one in the X-axis direction.

According to the transformation definition of the first component, the display position of the first component on the Y axis is changed in accordance with the value of a PLC signal. In FIG. 14, the value of a PLC signal transmitted to the item of the first component is "0" (G1_1SL_MY=0). In this case, the first component is displayed at a position on the Y axis in the technical drawing area 111 (refer to FIG. 5). Subsequently, the value of a PLC signal transmitted to the item of the first component becomes "1" (G1_1SL_MY=1) as in FIG. 15. Accordingly, the first component is displayed at a position shifted from its position in the technical drawing area 111 by one in the Y-axis direction.

According to the transformation definition of the second component, the display position of the second component on the Y axis is changed in accordance with the value of a PLC signal. In FIG. 14, the value of a PLC signal transmitted to the item of the second component is "0" (G1_2SL_MY=0). In this case, the second component is displayed at a position on the Y axis in the technical drawing area 111. Subsequently, the value of a PLC signal transmitted to the item of the second component becomes "2" (G1_2SL_MY=2). Accordingly, the second component is displayed at a position shifted from its position in the technical drawing area 111 by two in the Y-axis direction.

As in the first example described above, with the SCADA web HMI system of the present embodiment, it is possible to define information for handling a plurality of components on an HMI screen as an integrated component. Accordingly, it is possible to change the display states of the plurality of components all at once. As a result, it is possible to improve designing efficiency of an HMI screen having high-level animation effects.

Subsequently, processing by the web browser 32 in the above-described second example will be described below. In the case of the second example, in the static display processing, the first component, the second component, the third component, and the fourth component are placed on an HMI screen as illustrated in FIG. 16 in accordance with the disposition information thereof.

In the dynamic display processing, a transformation defined for the first component, a transformation defined for the second component, a transformation defined for the third component, a transformation defined for the fourth component, a transformation defined for the tenth integrated component, a transformation defined for the twentieth integrated component, and a transformation defined for the hundredth integrated component are executed on the web browser 32. In this case, the transformation of the hundredth integrated component as a duplicate integrated component is executed first. Subsequently, the transformations defined for the tenth and twentieth integrated components as integrated components included in the duplicate integrated component are executed. Subsequently, the transformations defined for the constituent components of each integrated component are executed. This means that Expression 7 is satisfied, when A represents a matrix that transforms the figure of each component, B represents a matrix that transforms the figure of each integrated component, C represents a matrix that transforms the figure of the duplicate integrated component, X represents a vector of the component before the transformation, and X' represents a vector thereof after the transformation.

$$X'=ABCX \qquad \text{Expression 7}$$

Accordingly, as illustrated in FIG. 17, the display positions of the first component, the second component, the third component, and the fourth component on the X and Y axes are changed in accordance with the values of PLC signals. More specific description is given below.

In the second example, according to the transformation definition of the hundredth integrated component, the display position of the hundredth integrated component on the X axis is changed in accordance with the value of a PLC signal. In FIG. 16, which illustrates an initial state, the value of a PLC signal transmitted to the item of the hundredth integrated component is "0" (G1_100SL_MX=0). In this case, the hundredth integrated component is displayed at a position on the X axis in the technical drawing area 111. In other words, the first and second components as child elements of the tenth integrated component as a child element of the hundredth integrated component are displayed at positions on the X axis in the technical drawing area 111. Furthermore, the third and fourth components as child elements of the twentieth integrated component as a child element of the hundredth integrated component are displayed at positions on the X axis in the technical drawing area 111.

Subsequently, the value of a PLC signal transmitted to the item of the hundredth integrated component becomes "1" (G1_100SL_MX=1) as in FIG. 17. Accordingly, the hundredth integrated component is displayed at a position shifted from its position in the technical drawing area 111 by one in the X-axis direction. In other words, the first and second components as child elements of the tenth integrated component as a child element of the hundredth integrated component, and the third and fourth components as child elements of the twentieth integrated component as a child element of the hundredth integrated component are displayed at positions shifted from their positions in the technical drawing area 111 by one in the X-axis direction.

According to the transformation definition of the tenth integrated component, the display position of the tenth integrated component on the Y axis is changed in accordance with the value of a PLC signal. In FIG. 16, the value of a PLC signal transmitted to the item of the tenth integrated component is "0" (G1_10SL_MY=0). In this case, the tenth integrated component is displayed at a position on the Y axis in the technical drawing area 111. In other words, the first component as a child element of the tenth integrated component is displayed at a position on the Y axis in the technical drawing area 111. Furthermore, the second component as a child element of the tenth integrated component is displayed at a position on the Y axis in the technical drawing area 111.

Subsequently, the value of a PLC signal transmitted to the item of the tenth integrated component becomes "1" (G1_10SL_MY=1) as in FIG. 17. Accordingly, the tenth integrated component is displayed at a position shifted from its position in the technical drawing area 111 by one in the Y-axis direction. In other words, the first component as a child element of the tenth integrated component is displayed at a position shifted from its position in the technical drawing area 111 by one in the Y-axis direction, and the second component as a child element of the tenth integrated component is displayed at a position shifted from its position in the technical drawing area 111 by one in the Y-axis direction.

According to the transformation definition of the twentieth integrated component, the display position of the twentieth integrated component on the Y axis is changed in accordance with the value of a PLC signal. In FIG. 16, the value of a PLC signal transmitted to the item of the twentieth integrated component is "0" (G1_20SL_MY=0). In this case, the twentieth integrated component is displayed at a position on the Y axis in the technical drawing area 111. In other words, the third component as a child element of the twentieth integrated component is displayed at a position on the Y axis in the technical drawing area 111. Furthermore, the fourth component as a child element of the twentieth integrated component is displayed at a position on the Y axis in the technical drawing area 111.

Subsequently, the value of a PLC signal transmitted to the item of the twentieth integrated component becomes "2" (G1_20SL_MY=2) as in FIG. 17. Accordingly, the twentieth integrated component is displayed at a position shifted from its position in the technical drawing area 111 by two in the Y-axis direction. In other words, the third component as a child element of the twentieth integrated component is displayed at a position shifted from its position in the technical drawing area 111 by two in the Y-axis direction. Furthermore, the fourth component as a child element of the twentieth integrated component is displayed at a position shifted from its position in the technical drawing area 111 by two in the Y-axis direction.

According to the transformation definition of the first component, the display position of the first component on the Y axis is changed in accordance with the value of a PLC signal. However, the transformation defined for the first component is executed after the transformation defined for the tenth integrated component, which changes the display position of the first component on the Y axis. Thus, the display position of the first component on the Y axis due to the transformation defined for the first component is a position relative to the display position (absolute position) of the first component on the Y axis due to the transformation defined for the tenth integrated component. In FIGS. 16 and 17, the value of a PLC signal transmitted to the item of the first component is "0" (G1_1SL_MY=0). Thus, the first component is displayed at a position when placed on the Y axis through the transformation defined for the tenth integrated component. When the value of a PLC signal transmitted to the item of the first component is "1" (G1_1SL_MY=1), the first component is displayed at a position shifted in the Y-axis direction by one from the position when placed through the transformation defined for the tenth integrated component.

According to the transformation definition of the second component, the display position of the second component on the Y axis is changed in accordance with the value of a PLC signal. However, similarly to the case of the first component, the display position of the second component on the Y axis due to the transformation defined for the second component is a position relative to the display position of the second component on the Y axis due to the transformation defined for the tenth integrated component. In FIGS. 16 and 17, the value of a PLC signal transmitted to the item of the second component is "0" (G1_2SL_MY=0). Thus, the second component is displayed at a position when placed on the Y axis through the transformation defined for the tenth integrated component. When the value of a PLC signal transmitted to the item of the second component is "1" (G1_2SL_MY=1), the second component is displayed at a position shifted in the Y-axis direction by one from the position when placed through the transformation defined for the tenth integrated component.

According to the transformation definition of the third component, the display position of the third component on the Y axis is changed in accordance with the value of a PLC signal. However, the transformation of the third component is executed after the transformation of the twentieth integrated component, which changes the display position of the third component on the Y axis. Thus, the display position of the third component on the Y axis due to the transformation defined for the third component is a position relative to the display position (absolute position) of the third component on the Y axis due to the transformation defined for the twentieth integrated component. In FIGS. 16 and 17, the value of a PLC signal transmitted to the item of the third component is "0" (G1_3SL_MY=0). Thus, the third component is displayed at a position when placed on the Y axis through the transformation defined for the twentieth integrated component. When the value of a PLC signal transmitted to the item of the third component is "2" (G1_3SL_MY=2), the third component is displayed at a position shifted in the Y-axis direction by two from the position when placed through the transformation defined for the twentieth integrated component.

According to the transformation definition of the fourth component, the display position of the fourth component on the Y axis is changed in accordance with the value of a PLC signal. However, similarly to the case of the third component, the display position of the fourth component on the Y axis due to the transformation defined for the fourth component is a position relative to the display position of the fourth component on the Y axis due to the transformation defined for the twentieth integrated component. In FIGS. 16 and 17, the value of a PLC signal transmitted to the item of the fourth component is "0" (G1_4SL_MY=0). Thus, the fourth component is displayed at a position on the Y axis in the technical drawing area 111. When the value of a PLC signal transmitted to the item of the fourth component is "2" (G1_4SL_MY=2), the fourth component is displayed at a position shifted in the Y-axis direction by two from the position when placed through the transformation defined for the twentieth integrated component.

As in the second example described above, according to the SCADA web HMI system of the present embodiment, it is possible to define information that handles a plurality of integrated components on an HMI screen as an integrated component. Accordingly, it is possible to change the display states of the plurality of integrated components all at once. As a result, it is possible to improve designing efficiency of an HMI screen having high-level animation effects.

1-5. Example

Subsequently, processing for achieving animation of the material conveyance vehicle schematic diagram described in "1. Overview" will be described below as a specific example.

Figure 20:
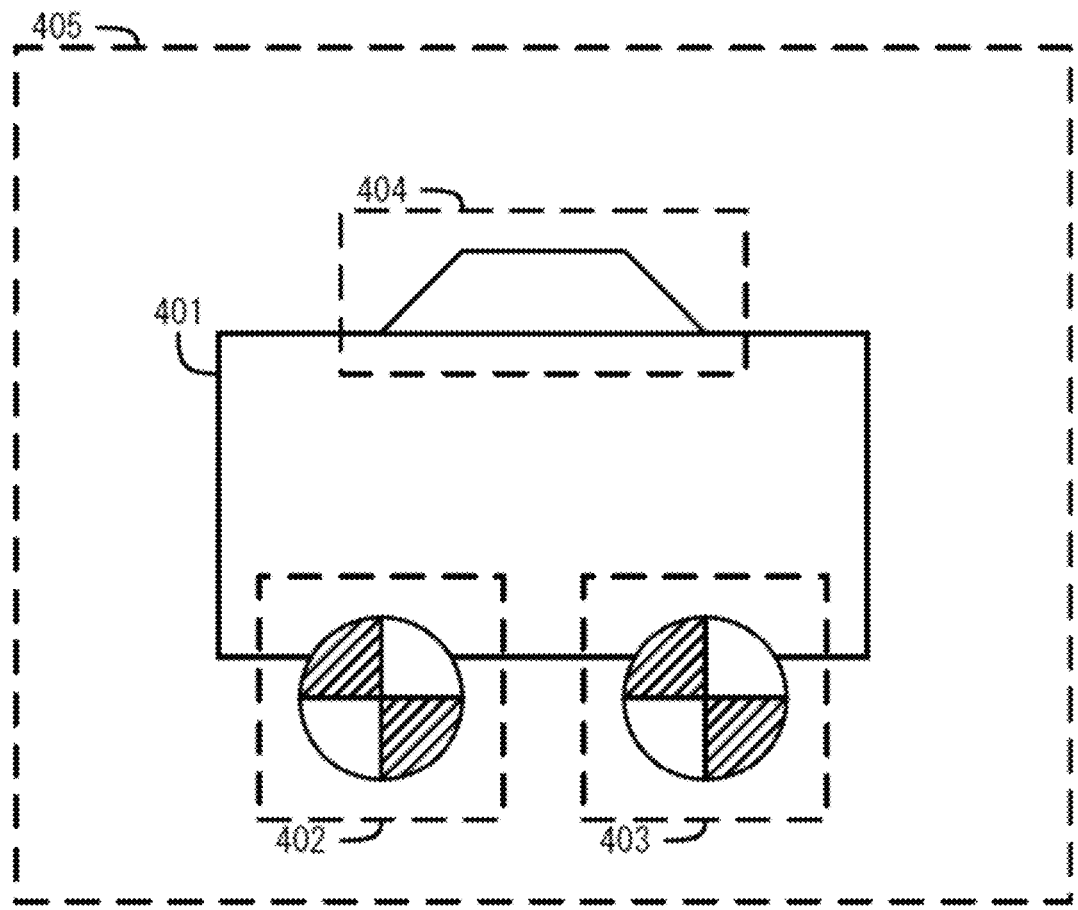
FIG. 20 is a material conveyance vehicle schematic diagram produced as an example of the HMI screen by the SCADA web HMI system.

FIG. 20 is a drawing produced as an exemplary HMI screen. The drawing of a material conveyance vehicle schematic diagram illustrated in FIG. 20 is constituted by four components 401 to 404 and an integrated component 405 having the four components as child elements. The component 401 as a cargo bed is provided with a display color attribute that changes its display color in response to the value of a PLC signal of the Boolean type. The relation between the value of a PLC signal and the display color of the component 401 is defined by a color rule in advance. The integrated components 402 and 403 as two wheels is provided with a rotation attribute that performs ¼ clockwise rotation each time the value of a PLC signal of the numerical type increases by one. The integrated component 404 as a material loaded on the cargo bed is provided with a display color attribute that changes its display color in response to the value of a PLC signal of the Boolean type, and a width-height attribute that changes the width-height magnification of the component in accordance with the value of a PLC signal of the numerical type. The relation between the value of a PLC signal and the display color of the integrated component 404 is defined by a color rule in advance. The integrated component 405 as a material conveyance vehicle is provided with a position attribute that changes the position of the integrated component on the X axis in accordance with a PLC signal of the numerical type.

Note that, as in the description of the stencil area 110, the integrated components 402 to 404 can be handled as components prepared in advance. Thus, the integrated components 402 to 404 may be interpreted as the components 402 to 404 in the following description.

FIG. 21 is a diagram illustrating component data of the material conveyance vehicle schematic diagram illustrated in FIG. 20. Subsequently, processing of grouping the components 401 to 404 will be described below with reference to FIG. 21.

Four-hundreds-and-first component data 411 is component data of a four-hundreds-and-first rectangle as a four-hundreds-and-first component. A four-hundreds-and-first component identifier is "component number 401". A four-hundreds-and-first attribute identifier is "display color". A four-hundreds-and-first display attribute is "change of the color of the component to white in a case of a PLC signal of "0" and change of the color of the component to a chromatic color in a case of a PLC signal of "1"". Furthermore, the item name "G1_401SL" is an identifier as a combination of "G1" indicating the screen identifier of an HMI screen, "401" indicating component number 401, and "SL" indicating the display color.

Four-hundreds-and-second integrated component data 412 is integrated component data of a four-hundreds-and-second integrated component. A four-hundreds-and-second integrated component identifier is "component number 402". A four-hundreds-and-second attribute identifier is "rotation". A four-hundreds-and-second display attribute is "¼ clockwise rotation each time the value of a PLC signal of the numerical type increases by one". Furthermore, the item name "G1_402SL_R" is an identifier as a combination of "G1" indicating the screen identifier of an HMI screen, "402" indicating integrated component number 402, "SL" indicating the integrated component, and "R" indicating rotation.

Four-hundreds-and-third integrated component data 413 is integrated component data of a four-hundreds-and-third integrated component. A four-hundreds-and-third integrated component identifier is "component number 403". A four-hundreds-and-third attribute identifier is "rotation". A four-hundreds-and-third display attribute is "¼ clockwise rotation each time the value of a PLC signal of the numerical type increases by one". Furthermore, the item name "G1_403SL_R" is an identifier as a combination of "G1" indicating the screen identifier of an HMI screen, "403" indicating integrated component number 403, "SL" indicating the integrated component, and "R" indicating rotation.

Four-hundreds-and-fourth integrated component data 414a is integrated component data that determines a first attribute of a four-hundreds-and-fourth integrated component. A four-hundreds-and-fourth integrated component identifier is "component number 404". A four-hundreds-and-fourth attribute identifier "a" is "display color". A four-hundreds-and-fourth display attribute "a" is "change of the color of the component to white in a case of a PLC signal of "0" and change of the color of the component to a chromatic color in a case of a PLC signal of "1"". Furthermore, the item name "G1_404SL" is an identifier as a combination of "G1" indicating the screen identifier of an HMI screen, "404" indicating integrated component number 404, and "SL" indicating the display color.

Four-hundreds-and-fourth integrated component data 414b is integrated component data that determines a second attribute of the four-hundreds-and-fourth integrated component. The four-hundreds-and-fourth integrated component identifier is "component number 404". A four-hundreds-and-fourth attribute identifier "b" is "width-height". A four-hundreds-and-fourth display attribute "b" is "change of the width-height magnification of the component in accordance with the value of a PLC signal of the numerical type". Furthermore, the item name "G1_404SL_EWH" is an identifier as a combination of "G1" indicating the screen identifier of an HMI screen, "404" indicating integrated component number 404, and "EWH" indicating the width-height magnification.

The integrated component 405 as a material conveyance vehicle is produced by grouping the components 401 to 404 described above. Through grouping processing, the fourhundreds-and-first component data 411, the four-hundreds-and-second component data 412, the four-hundreds-and-third component data 413, and the four-hundreds-and-fourth component data 414a and 414b are each additionally provided with data indicating that the component belongs to a four-hundreds-and-fifth integrated component.

Four-hundreds-and-fifth integrated component data 415 is data of an integrated component having the four-hundreds-and-first component, the four-hundreds-and-second integrated component, the four-hundreds-and-third integrated component, and the four-hundreds-and-fourth integrated component as child elements. A four-hundreds-and-fifth integrated component identifier is "component number 405". A four-hundreds-and-fifth attribute identifier is "display position on the X axis". A four-hundreds-and-fifth display attribute is "change of the display position of the component on the X axis in accordance with the value of a PLC signal". Furthermore, the item name "G1_405SL_MX" is an identifier as a combination of "G1" indicating the screen identifier of an HMI screen, "405" indicating integrated component number 405, "SL" indicating the integrated component, and "MX" indicating the display position on the X axis.

Figure 22:
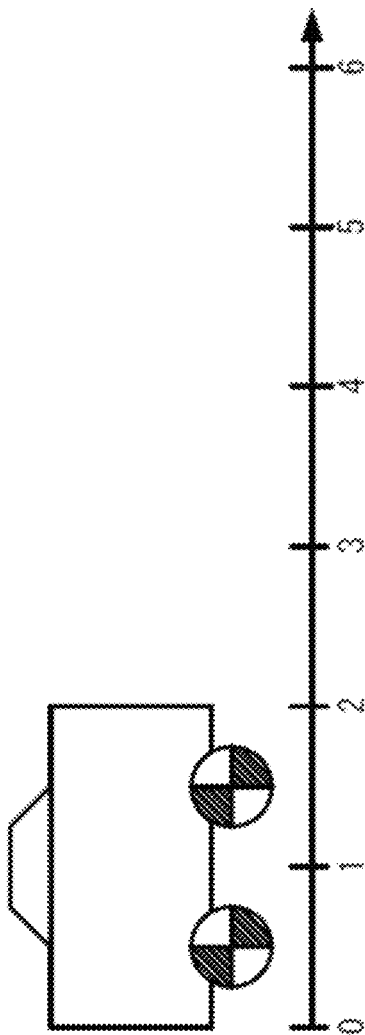
FIG. 22 is a diagram illustrating component data of the material conveyance vehicle schematic diagram illustrated in FIG. 20 before movement and the appearance of a material conveyance vehicle represented by the component data.
Figure 23:
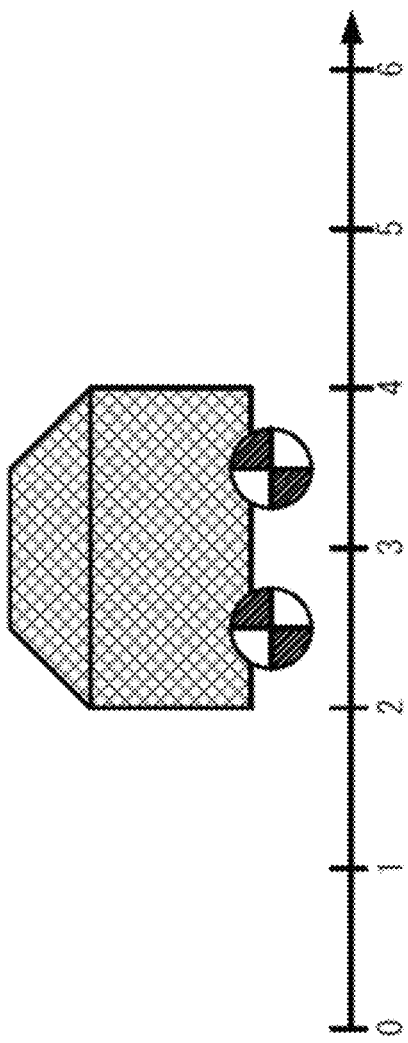
FIG. 23 is a diagram illustrating component data of the material conveyance vehicle schematic diagram illustrated in FIG. 20 after movement and the appearance of a material conveyance vehicle represented by the component data.

Subsequently, animation of a material conveyance vehicle schematic diagram will be described below with reference to FIGS. 22 and 23. FIG. 22 is a diagram illustrating component data of the material conveyance vehicle schematic diagram illustrated in FIG. 20 before movement and the appearance of a material conveyance vehicle represented by the component data. FIG. 23 is a diagram illustrating component data of the material conveyance vehicle schematic diagram illustrated in FIG. 20 after movement and the appearance of a material conveyance vehicle represented by the component data.

According to the transformation definition of the four-hundreds-and-fifth integrated component, the display position of the four-hundreds-and-fifth integrated component on the X axis is changed in accordance with the value of a PLC signal. In FIG. 22 as an initial state, the value of a PLC signal transmitted to the item of the four-hundreds-and-fifth integrated component is "0" (G1_405SL_MX=0). In this case, the four-hundreds-and-fifth integrated component is displayed at a position on the X axis in the technical drawing area 111. In other words, the four-hundreds-and-first integrated component, the four-hundreds-and-second integrated component, the four-hundreds-and-third integrated component, and the four-hundreds-and-fourth integrated component as child elements of the four-hundreds-and-fifth integrated component are displayed at positions on the X axis in the technical drawing area 111.

Subsequently, the value of a PLC signal transmitted to the item of the four-hundreds-and-fifth integrated component becomes "2" (G1_405SL_MX=2) as in FIG. 23. Accordingly, the four-hundreds-and-fifth integrated component is displayed at a position shifted in the X-axis direction by two from the position in the technical drawing area 111. In other words, the four-hundreds-and-first integrated component, the four-hundreds-and-second integrated component, the four-hundreds-and-third integrated component, and the four-hundreds-and-fourth integrated component as child elements of the four-hundreds-and-fifth integrated component are displayed at positions shifted in the X-axis direction by two from their positions in the technical drawing area 111.

According to the transformation definition of the four-hundreds-and-first component, its display color is changed depending on whether the value of a PLC signal is "0" (attribute value is "0") or "1" (attribute value is "1"). In FIG. 22, the value of a PLC signal transmitted to the item corresponding to the display color attribute of the four-hundreds-and-first component is "0" (G1_401SL=0). In this case, the four-hundreds-and-first component is displayed in a white display color. Subsequently, the value of a PLC signal transmitted to the item corresponding to the display color attribute of the four-hundreds-and-first component becomes "1" (G1_401SL=1) as in FIG. 23. Accordingly, the four-hundreds-and-first component is displayed in a chromatic display color.

According to the transformation definition of the four-hundreds-and-second integrated component, the four-hundreds-and-second integrated component is rotated clockwise by ¼ each time the value of a PLC signal of the numerical type increases by one. In FIG. 22, the value of a PLC signal transmitted to the item of the four-hundreds-and-second integrated component is "0" (G1_402SL_R=0). In this case, the four-hundreds-and-second integrated component is displayed at an angle when placed in the technical drawing area 111. Subsequently, the value of a PLC signal transmitted to the item of the four-hundreds-and-second integrated component becomes "1" (G1_402SL_R=1) as in FIG. 23. Accordingly, the four-hundreds-and-second integrated component is displayed at an angle rotated clockwise by ¼ from the angle when placed in the technical drawing area 111.

According to the transformation definition of the four-hundreds-and-third integrated component, the four-hundreds-and-third integrated component is rotated clockwise by ¼ each time the value of a PLC signal of the numerical type increases by one. In FIG. 22, the value of a PLC signal transmitted to the item of the four-hundreds-and-third integrated component is "0" (G1_403SL_R=0). In this case, the four-hundreds-and-third integrated component is displayed at an angle when placed in the technical drawing area 111. Subsequently, the value of a PLC signal transmitted to the item of the four-hundreds-and-third integrated component becomes "1" (G1_403SL_R=1) as in FIG. 23. Accordingly, the four-hundreds-and-third integrated component is displayed at an angle rotated clockwise by ¼ from the angle when placed in the technical drawing area 111.

According to the transformation definition of the four-hundreds-and-fourth integrated component, its display color is changed depending on whether the value of a PLC signal is "0" (attribute value is "0") or "1" (attribute value is "1"). In FIG. 22, the value of a PLC signal transmitted to the item corresponding to the display color attribute of the four-hundreds-and-fourth integrated component is "0" (G1_404SL=0). In this case, the four-hundreds-and-fourth integrated component is displayed in a white display color. Subsequently, the value of a PLC signal transmitted to the item corresponding to the display color attribute of the four-hundreds-and-fourth integrated component becomes "1" (G1_404SL=1) as in FIG. 23. Accordingly, the four-hundreds-and-fourth integrated component is displayed in a chromatic display color.

Furthermore, according to the transformation definition of the four-hundreds-and-fourth integrated component, the width-height magnification of the four-hundreds-and-fourth integrated component is changed in accordance with the value of a PLC signal of the numerical type. In FIG. 22, the value of a PLC signal transmitted to the item corresponding to the width-height attribute of the four-hundreds-and-fourth integrated component is "1.0" (G1_404SL_EWH=1.0). In this case, the four-hundreds-and-fourth integrated component is displayed at a magnification 1.0 times larger than a width-height when placed in the technical drawing area 111. Subsequently, the value of a PLC signal transmitted to the item corresponding to the width-height attribute of the four-hundreds-and-fourth integrated component becomes "2.0" (G1_404SL_EWH=2.0) as in FIG. 23. Accordingly, the four-hundreds-and-fourth integrated component is displayed at a magnification 2.0 times larger than a width-height when placed in the technical drawing area 111.

In conventional SCADA, a transformation is separately defined for each of the four components 401 to 404. The four components are each provided with an animation effect by the transformation separately defined for the component, and are provided with an animation effect that handles the four components as an integrated component and changes their display positions on the X axis. Furthermore, when integrated components such as the integrated components 402 and 403 as two wheels are not prepared in advance, the wheels need to be constituted by combining primitive components. In the conventional SCADA, it is needed to define a transformation that rotates a wheel as an integrated component without changing the relative positions of the primitive components constituting the wheel.

However, when grouping processing is performed and information that handles a plurality of components as an integrated component is defined as in the above-described example, transformation logic is not affected by change of the number of components constituting the vehicle body and wheels of a material conveyance vehicle. Thus, it can be expected that the productivity of animation becomes high and drawing performance at execution improves due to decrease of the number of transformations.

Furthermore, in the above-described example, the integrated component 405 is provided with an animation effect that is applied to the integrated component 405 as a whole but not individually applied to the four components 401 to 404 included in the integrated component 405. In addition, each component included in the integrated component 405 is provided with an animation effect that is applied to the component but not applied to any other component included in the integrated component. In this manner, since independent animation effects are provided to an integrated component and each component included in the integrated component, it is possible to produce an HMI screen having high-level animation effects and improve designing efficiency of the HMI screen.

1-6. Exemplary GUI Screen

Figure 24:
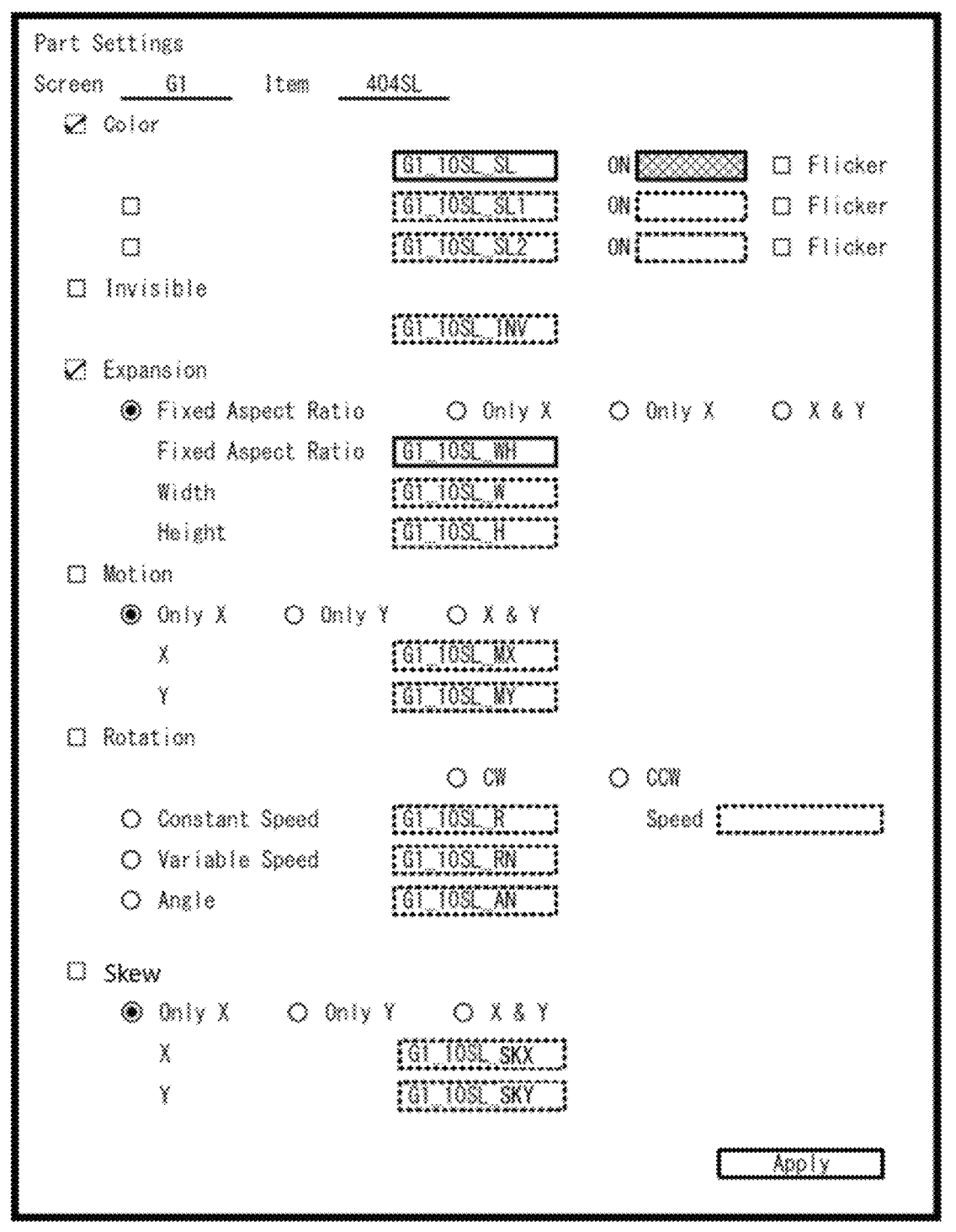

FIG. 24 is an exemplary screen of a GUI that defines attributes for providing an animation effect to a component. An attribute that can be defined on the screen is an attribute for providing an animation effect to a component. In this example, whether to define an attribute can be selected on the screen for each of component attributes "display color", "non-display", "width-height", "position", "rotation", and "shear". Attribute definition can be also performed for the components 401 to 404 and the integrated component 405 in the above-described example by using the GUI screen as illustrated in FIG. 24.

For the display color attribute (Color), it is possible to select whether to define the display color attribute. When the attribute is to be defined, a display color and a flicker attribute can be specified in one color rule. Each color rule has a priority (SL<SL1<SL2). When there are a plurality of color rules for which the value of an allocated PLC signal is "ON", a display color and a flicker attribute in a color rule having the highest priority are reflected on a drawing component.

For the non-display attribute (Invisible), it is possible to select whether to define the non-display attribute.

For the width-height attribute (Expansion), it is possible to select whether to define the width-height attribute. When the attribute is to be defined, width-height magnification with a fixed ratio, any one of width magnification, height magnification, and width and height magnification can be selected.

For the position attribute (Motion), it is possible to select whether to define the position attribute. When the attribute is to be defined, any one of a display position on the X axis, a display position on the Y axis, and display positions on the X and Y axes can be selected.

For the rotation attribute (Rotation), it is possible to select whether to define the rotation attribute. When the attribute is to be defined, a clockwise or anticlockwise rotational direction can be selected. Furthermore, as for the amount of rotation, any one of rotation at a fixed speed defined in advance in accordance with a value of the Boolean type, rotation at a variable speed in accordance with a value of the numerical type, and rotation with a specified angle in accordance with a value of the numerical type can be selected.

For the shear attribute (Skew), it is possible to select whether to define the shear attribute. When the attribute is to be defined, any one of a shear angle in the X-axis direction, a shear angle in the Y-axis direction, and shear angles in the X-axis and Y-axis directions can be selected.

1-7. Others

In the system of the present embodiment, the web server 31 and the web browser 32 are executed on the same computer, but the present invention is not limited thereto. A plurality of web browsers 32 are connected to one web server 31 in some cases. Thus, the web server 31 and the web browser 32 may be operated on different computers. Note that, this is same for an embodiment described below.

Furthermore, in the system of the present embodiment, drawing data in the SVG format is used, but drawing data is not limited thereto. When the web browser 32 is compatible with Web GL, drawing data may be in a format compatible with Web GL.

Furthermore, in the system of the present embodiment, the hundredth integrated component as a duplicate integrated component is produced by grouping the tenth integrated component and the twentieth integrated component in the above-described second example. However, integrated component duplication is not limited thereto. Grouping may be performed in further duplication such as triple or quadruple duplication as necessary, and a duplicate integrated component may be produced by grouping an integrated component and a unit component.

2. Second Embodiment

2-1. Overview

Figure 25:
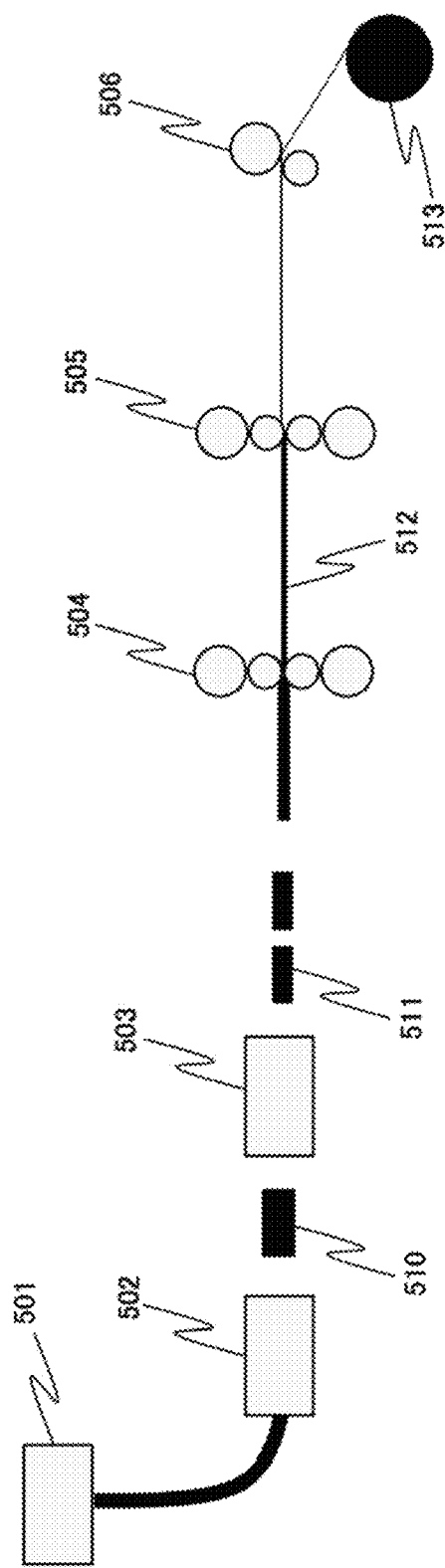
FIG. 25 is a diagram illustrating the configuration of an iron steel milling line.

Subsequently, a SCADA web HMI system according to a second embodiment of the present invention will be described below. The present SCADA web HMI system is applied to an iron steel milling monitoring control system. FIG. 25 is a diagram illustrating the configuration of an iron steel milling line as a monitoring target of the iron steel milling monitoring control system.

On the iron steel milling line, a mold 501, a heating furnace 502, a sizing press 503, a rough rolling mill 504, a finish rolling mill 505, and a winder 506 are sequentially disposed from upstream. The size of a slab 510 output from the heating furnace 502 is uniformed at the sizing press 503. Slabs 511 having uniformed sizes are welded for continuous casting and milled through the rough rolling mill 504 and the finish rolling mill 505. A steel plate 512 produced by the milling is wound as a coil 513 through the winder 506.

The sizing press 503 uniforms the section size of a slab to efficiently perform rough milling and finish milling in post-processing. In the present embodiment, change of the shape of the slab through passing at the sizing press 503 is expressed in animation to allow an operator to monitor the state of the sizing press 503.

2-2. Slab Component Data

Figure 26:
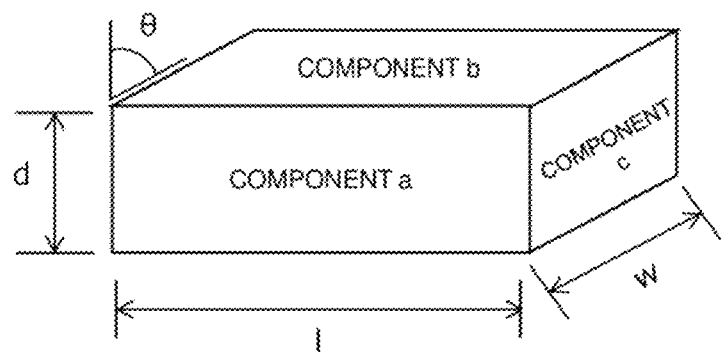
FIG. 26 is an exemplary slab schematic diagram produced as an HMI screen by a SCADA web HMI system according to a second embodiment of the present invention.

A slab is a steel plate having a length l, a width w, and a thickness d and can be expressed in a schematic diagram as illustrated in FIG. 26. The present SCADA web HMI system illustrates an oblique projection drawing of a slab with a tilt angle θ to stereoscopically express change of the shape of the slab.

Figure 27:
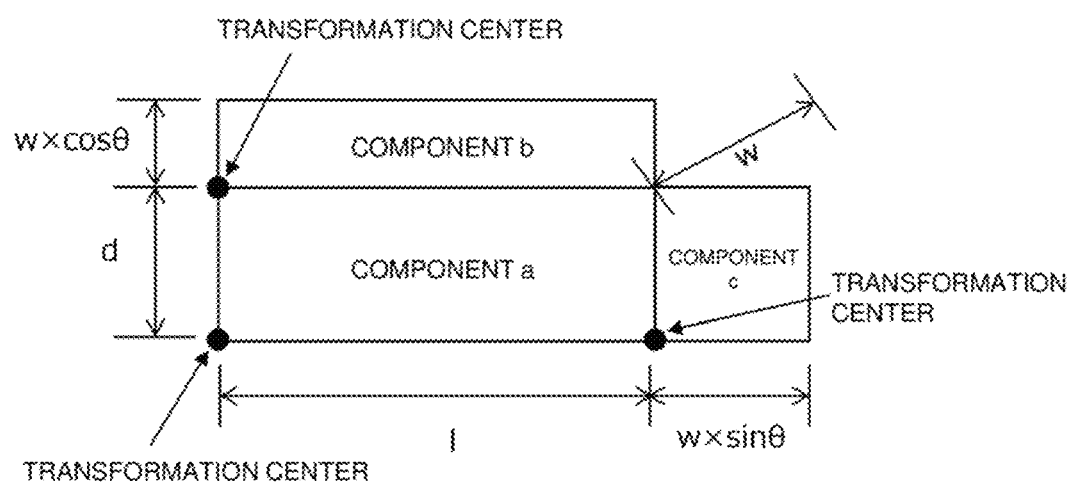
FIG. 27 is a diagram illustrating components for drawing the slab schematic diagram illustrated in FIG. 25.

A slab illustrated in FIG. 26 can be produced by using three components illustrated in FIG. 27. A component "a", a component "b", and a component "c" are all primitive components. A shear transformation expressed in a transformation skew(0, −θ) is performed on the component "b", and a shear transformation expressed in a transformation skew(−θ, θ) is performed on the component "c". The center of the transformation of each component is the lower-left corner of the component. The slab can be expressed as an integrated component by grouping the component "a" and the components "b" and "c" subjected to the shear transformations.

A figure transformation of a slab schematic diagram is needed to express change of the shape of the slab through passing at the sizing press 503 in animation. A specific example will be described below with reference to FIG. 28. In FIG. 28, the slab before shape adjustment at the sizing press 503 is illustrated on the left side, and the slab after shape adjustment at the sizing press 503 is illustrated on the right side. The dimensions of the slab before shape adjustment are the length l, the width w, and the thickness d. The dimensions of the slab after shape adjustment are a length l', a width w', and a thickness d'.

The shape change of the slab illustrated in FIG. 28 can be achieved by independently changing the dimensions of each of the component "a", the component "b", and the component "c". Specifically, scale change expressed in a transformation scale(l'/l, dl'/d) is performed on the component "a", scale change expressed in a transformation scale(0, d*w'/(d'*w)) is performed on the component "b", and scale change expressed in a transformation scale(l*w'/(l'*w), 0) is performed on the component "c".

In addition, a transformation for moving the position of the slab is needed to express the slab flowing along the milling line. This transformation is expressed in a transformation translate(x−x0, y−y0) and performed on the integrated component of the slab. Note that, x and y are optional positions to which the slab moves, and x0 and y0 are the original positions of the slab.

The dimensions and position of the slab can be optionally changed by applying the above-described transformations to each component and the integrated component. Thus, in the present SCADA web HMI system, the figure of the slab illustrated in FIG. 26 is produced at the SCADA web HMI designing device, and a position transformation on the integrated component and a scale transformation on each component in execution are performed at the SCADA web HMI execution device. Accordingly, the slab can be displayed in an optional shape at an optional position on a screen.

2-3. System Configuration of Iron Steel Milling Monitoring Control System

Figure 29:
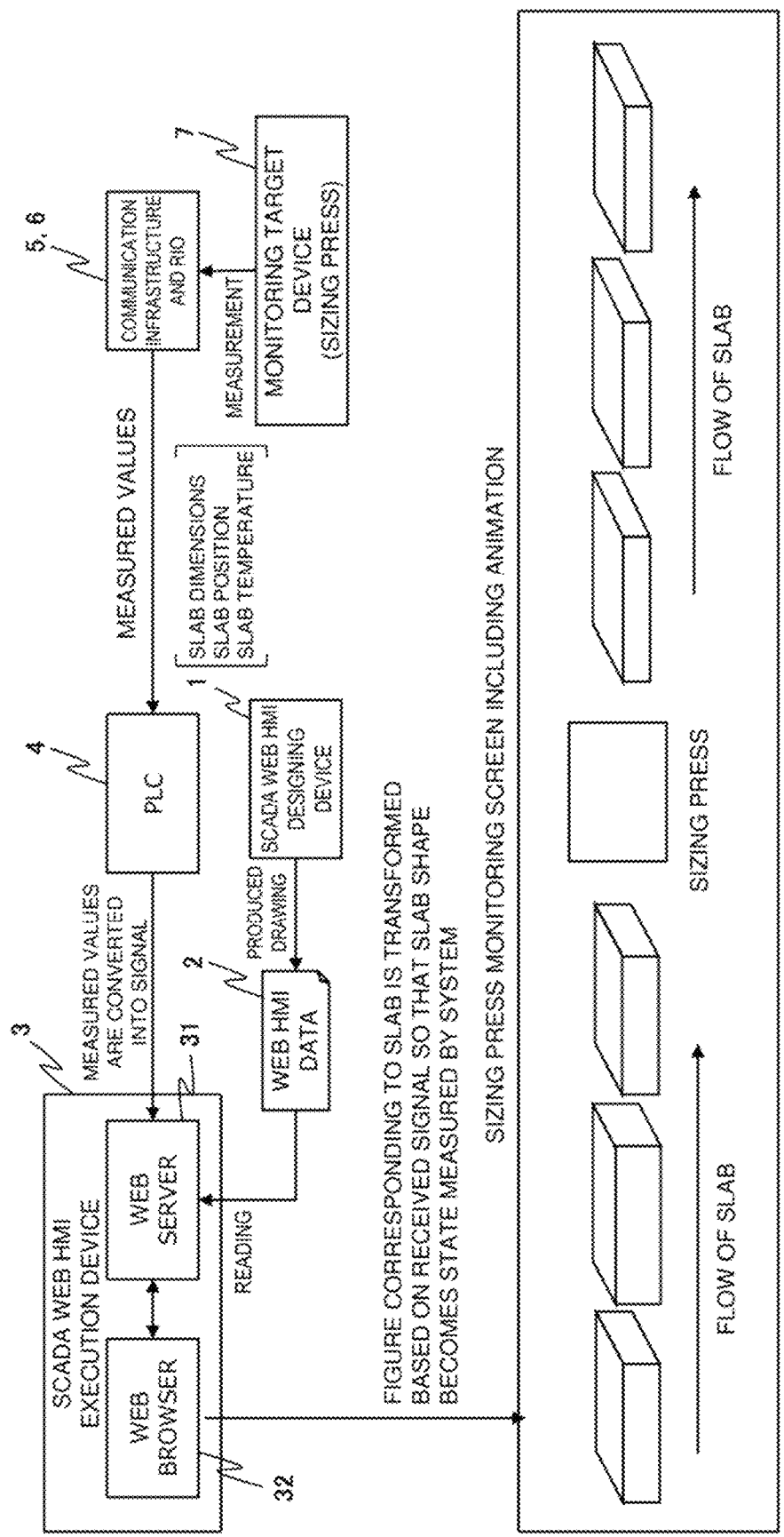
FIG. 29 is a diagram illustrating a system configuration of an iron steel milling monitoring control system in which the SCADA web HMI system according to the second embodiment of the present invention is provided.
Figure 30:
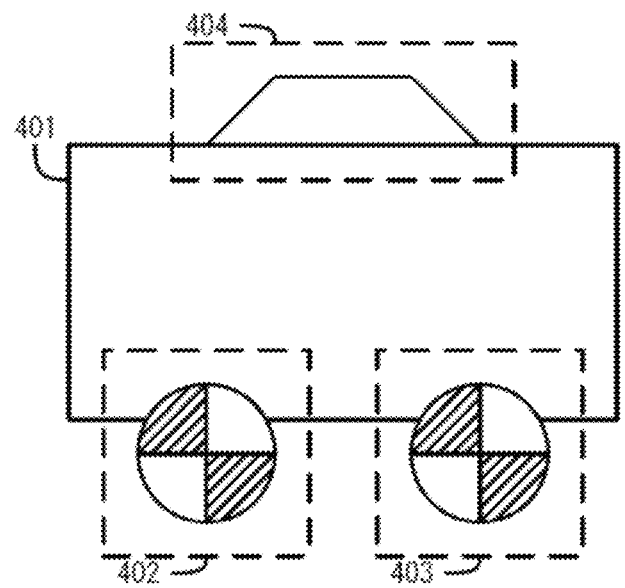
FIG. 30 is an exemplary material conveyance vehicle schematic diagram produced as an HMI screen.
Figure 31:
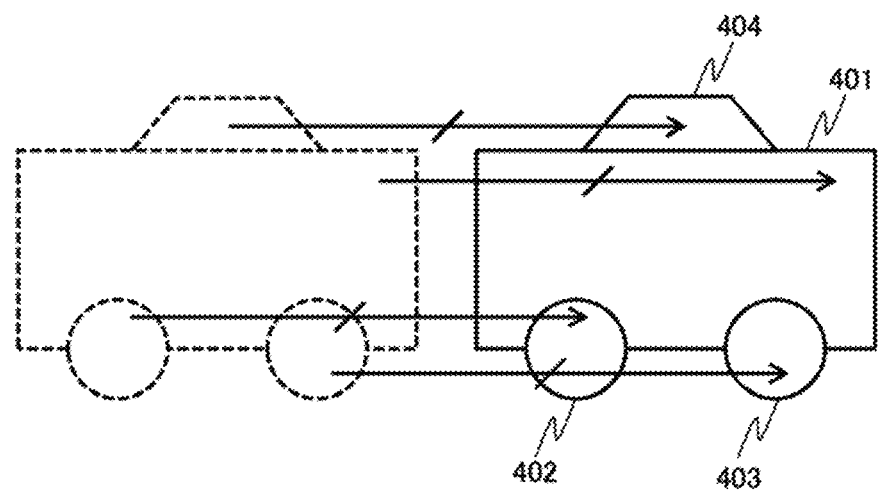
FIG. 31 is a diagram illustrating an animation effect of movement for changing the material conveyance vehicle schematic diagram illustrated in FIG. 30 through animation.
Figure 32:
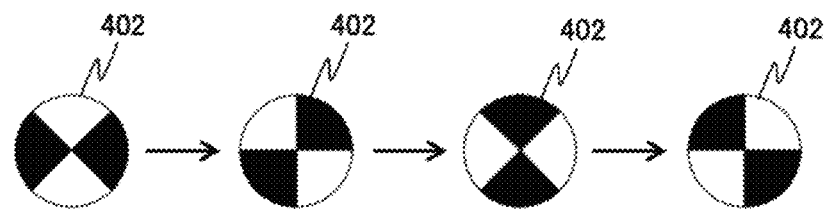
FIG. 32 is a diagram illustrating an animation effect of rotation for changing the material conveyance vehicle schematic diagram illustrated in FIG. 30 through animation.

FIG. 29 is a diagram illustrating a system configuration of the iron steel milling monitoring control system in which the present SCADA web HMI system is provided. As illustrated in the diagram, measured values such as the dimensions, position, and temperature of the slab can be obtained from the monitoring target device (including the sizing press) 7 through the RIO 6 and the communication infrastructure 5. These measured values are converted into a signal at the PLC 4 and input to the web server 31 of the SCADA web HMI execution device 3. The web server 31 reads the web HMI data 2 including component data of the above-described slab produced by the SCADA web HMI designing device 1.

The web HMI data 2 read by the web server 31 is executed at the web browser 32, and the position and shape of the slab placed on a screen are changed in accordance with the value of the signal from the PLC 4. Accordingly, animation that truly expresses the state of the sizing press can be displayed on a monitoring screen by using the measured values obtained from the monitoring target device 7. Note that it is known that the color of the slab changes with temperature. Thus, the color of the slab on the monitoring screen may be changed based on the temperature of iron acquired from a temperature sensor. Accordingly, the state of the slab can be intuitively understood.

REFERENCE SIGNS LIST

1 SCADA web HMI designing device
1*a* processor
1*b* memory
1*c* display
1*d* input-output interface
2 web HMI data
3 SCADA web HMI execution device
3*a* processor
3*b* memory
3*c* display
3*d* input interface
3*e* network interface
4 monitoring control system (PLC)
5 communication infrastructure
6 RIO
7 monitoring target device
10 engineering tool
11 technical drawing processing
12 component data generation processing
13 component data edit processing
14 integrated component data edit processing
15 web HMI data generation processing
16 device list generation processing
17 grouping processing
18 integrated component identifier generation processing
19 component data change processing
20 integrated component data generation processing
21 static display attribute data
22 runtime attribute data
23 device list 31 web server
32 web browser
41 first component data
42 second component data
43 tenth integrated component data
51 first component data
52 second component data
53 third component data
54 fourth component data
55 tenth integrated component data
56 twentieth integrated component data
57 hundredth integrated component data
110 stencil area
110a master shape of horizontal line component
110b master shape of vertical line component
110c master shape of rectangular component
110d master shape of circular component
111 technical drawing area
112 range specification
311 HMI server runtime
321 HMI web runtime
401 four-hundreds-and-first component
402 four-hundreds-and-second integrated component
403 four-hundreds-and-third integrated component
404 four-hundreds-and-fourth integrated component
405 four-hundreds-and-fifth integrated component
411 four-hundreds-and-first component data
412 four-hundreds-and-second integrated component data
413 four-hundreds-and-third integrated component data
414a four-hundreds-and-fourth integrated component data
414b four-hundreds-and-fourth integrated component data
415 four-hundreds-and-fifth integrated component data
501 mold
502 heating furnace
503 sizing press
504 rough rolling mill
505 finish rolling mill
506 winder
510 slab before shape adjustment
511 slab after shape adjustment
512 milled steel plate
513 coil

The invention claimed is:

1. A SCADA web HMI system including a web browser configured to display an HMI screen, the SCADA web HMI system being configured to change an appearance of a component placed on the HMI screen in accordance with a value of a PLC signal received from a programmable logic controller, the SCADA web HMI system comprising:
at least one processor;
at least one memory storing at least one computer program,
wherein the at least one processor executes, in accordance with the at least one computer program,
processing of generating an integrated component by grouping a plurality of components including a first component,
processing of generating a duplicate integrated component by grouping a plurality of components including the integrated component,
processing of providing, to the integrated component, a first animation effect that is applied to the integrated component as a whole but not individually applied to components constituting the integrated component,
processing of providing, to the first component, a second animation effect that is applied to the first component but not applied to components constituting the integrated component except for the first component,
processing of providing, to the duplicate integrated component, a third animation effect that is applied to the duplicate integrated component as a whole but not individually applied to components constituting the duplicate integrated component,
processing of associating the first animation effect with a value of a first PLC signal,
processing of associating the second animation effect with a value of a second PLC signal,
processing of associating the third animation effect with a value of a third PLC signal,
processing of receiving the first PLC signal and changing the appearance of the integrated component in the HMI screen through animation in accordance with the value of the first PLC signal,
processing of receiving the second PLC signal and changing the appearance of the first component in the HMI screen through animation in accordance with the value of the second PLC signal, and
processing of receiving the third PLC signal and changing the appearance of the duplicate integrated component in the HMI screen through animation in accordance with the value of the third PLC signal.

2. The SCADA web HMI system according to claim 1, wherein
the first animation effect includes at least one of display color change of the integrated component and a figure transformation of the integrated component, and the figure transformation of the integrated component includes at least one of scaling, rotation, translation, shear, and a combination of scaling, rotation, translation, and shear,
the second animation effect includes at least one of display color change of the first component and a figure transformation of the first component, and the figure transformation of the first component includes at least one of scaling, rotation, translation, shear, and a combination of scaling, rotation, translation, and shear, and
the third animation effect includes at least one of display color change of the duplicate integrated component and a figure transformation of the duplicate integrated component, and the figure transformation of the duplicate integrated component includes at least one of scaling, rotation, translation, shear, and a combination of scaling, rotation, translation, and shear.

3. The SCADA web HMI system according to claim 2, wherein
the SCADA web HMI system includes a GUI, and
the at least one processor executes processing of receiving an operation on the GUI in accordance with the at least one computer program and performs the figure transformation of the integrated component, the figure transformation of the first component, and the figure transformation of the duplicate integrated component based on a central point of each figure specified by the operation on the GUI.

4. The SCADA web HMI system according to claim 1, wherein
the SCADA web HMI system includes a GUI, and
the at least one processor executes processing of receiving an operation on the GUI in accordance with the at least one computer program and executes, based on the operation on the GUI, the processing of providing the first animation effect to the integrated component, the processing of providing the second animation effect to the first component, and the processing of providing the third animation effect to the duplicate integrated component.

5. The SCADA web HMI system according to claim 1, wherein the SCADA web HMI system
is provided in an iron steel milling monitoring control system, and
is configured to provide a slab made of a plurality of components on the HMI screen and change the appearance of the slab in the HMI screen through animation in accordance with the value of the PLC signal from the programmable logic controller placed on an iron steel milling line.

* * * * *